United States Patent
Bowers et al.

(10) Patent No.: US 11,016,317 B2
(45) Date of Patent: May 25, 2021

(54) RECONFIGURABLE INTEGRATED-OPTICS-BASED NON-RECIPROCAL DEVICES

(71) Applicant: The Regents of the University of California, Oakland, CA (US)

(72) Inventors: John E. Bowers, Santa Barbara, CA (US); Paolo Pintus, Santa Barbara, CA (US); Duanni Huang, Goleta, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 165 days.

(21) Appl. No.: 16/074,905

(22) PCT Filed: Feb. 1, 2017

(86) PCT No.: PCT/US2017/016075
§ 371 (c)(1),
(2) Date: Aug. 2, 2018

(87) PCT Pub. No.: WO2017/136459
PCT Pub. Date: Aug. 10, 2017

(65) Prior Publication Data
US 2019/0049757 A1   Feb. 14, 2019

Related U.S. Application Data

(60) Provisional application No. 62/290,341, filed on Feb. 2, 2016.

(51) Int. Cl.
*G02F 1/09* (2006.01)
*G02F 1/095* (2006.01)
*G02F 1/313* (2006.01)
*G02F 2/00* (2006.01)
*G02B 6/27* (2006.01)
*G02B 6/42* (2006.01)

(52) U.S. Cl.
CPC ........... *G02F 1/092* (2013.01); *G02B 6/2746* (2013.01); *G02B 6/4209* (2013.01);
(Continued)

(58) Field of Classification Search
CPC ..... G02F 1/092; G02F 1/0955; G02B 6/2746; G02B 6/4208
(Continued)

(56) References Cited

U.S. PATENT DOCUMENTS 5,949,311 A * 9/1999 Weiss ............... H01P 1/215
333/202
6,141,470 A * 10/2000 Espindola ........... G02B 6/022
385/24
(Continued)

FOREIGN PATENT DOCUMENTS

WO   20131057444 A1   4/2013

OTHER PUBLICATIONS

Yuya Shoji et al., "Magneto-optical isolator with silicon waveguides fabricated by direct bonding", "Applied Physics Letters", Feb. 21, 2008, 92, https://doi.org/10.1063/1.2884855.
(Continued)

*Primary Examiner* — Ricky D Shafer
(74) *Attorney, Agent, or Firm* — Billion & Armitage

(57) ABSTRACT

Reconfigurable non-reciprocal integrated-optics-based devices are disclosed. The non-reciprocal devices include: a phase-sensitive device, such as a microring waveguide; a magneto-optic layer; and an electromagnet. These elements are operatively coupled such that a magnetic field generated by current flow through the electromagnet gives rise to a non-reciprocal phase shift in the phase-sensitive device. The non-reciprocal phase shift leads to a difference in the way that a light signal travels in the forward and backward directions through one or more bus waveguides that are
(Continued)

operatively coupled with the phase-sensitive element. The non-reciprocity is reversible by reversing the direction of drive current flow in the electromagnet, which enables the inter-port connectivity of the ports of these bus waveguides to be reconfigured based on the direction of the drive current flow. Examples of reconfigurable isolator and circulator embodiments are described.

20 Claims, 16 Drawing Sheets

(52) U.S. Cl.
 CPC ............ G02F 1/0955 (2013.01); G02F 1/313 (2013.01); G02F 2/002 (2013.01)

(58) Field of Classification Search
 USPC .......................... 359/484.03, 484.05; 385/11
 See application file for complete search history.

(56) References Cited

U.S. PATENT DOCUMENTS

| | | | | |
|---|---|---|---|---|
| 6,215,935 | B1 * | 4/2001 | Dagens | ................... G02F 1/025 385/131 |
| 7,826,690 | B2 * | 11/2010 | Nakajima | ............. G02F 1/0955 385/6 |
| 7,995,893 | B2 * | 8/2011 | Bi | ......................... G02F 1/0039 257/E27.006 |
| 8,306,371 | B2 * | 11/2012 | Yokoi | ...................... G02B 6/12 385/6 |
| 8,335,407 | B2 * | 12/2012 | Yokoi | .................... G02B 6/132 385/14 |
| 8,396,337 | B2 | 3/2013 | Kroemer et al. | |
| 2005/0169582 | A1 | 8/2005 | Tan et al. | |
| 2007/0064753 | A1 * | 3/2007 | Accard | ................. G02F 1/0955 372/39 |
| 2010/0307678 | A1 | 12/2010 | Yokoi | |
| 2012/0002914 | A1 | 1/2012 | Kroemer et al. | |
| 2015/0030280 | A1 * | 1/2015 | Alu | ....................... G02F 1/0136 385/2 |

OTHER PUBLICATIONS

Ming-Chun Tien, et al., "Silicon ring isolators with bonded nonreciprocal magneto-optic garnets", "Optics Express", Publisher: Optical Society of America, Jun. 1, 2011, vol. 19, No. 12.

Authorized Officer: Delimon, Ktista, International Search Report and Written Opinion issued in PCT application No. PCT/US17/16075., dated Apr. 21, 2017.

* cited by examiner

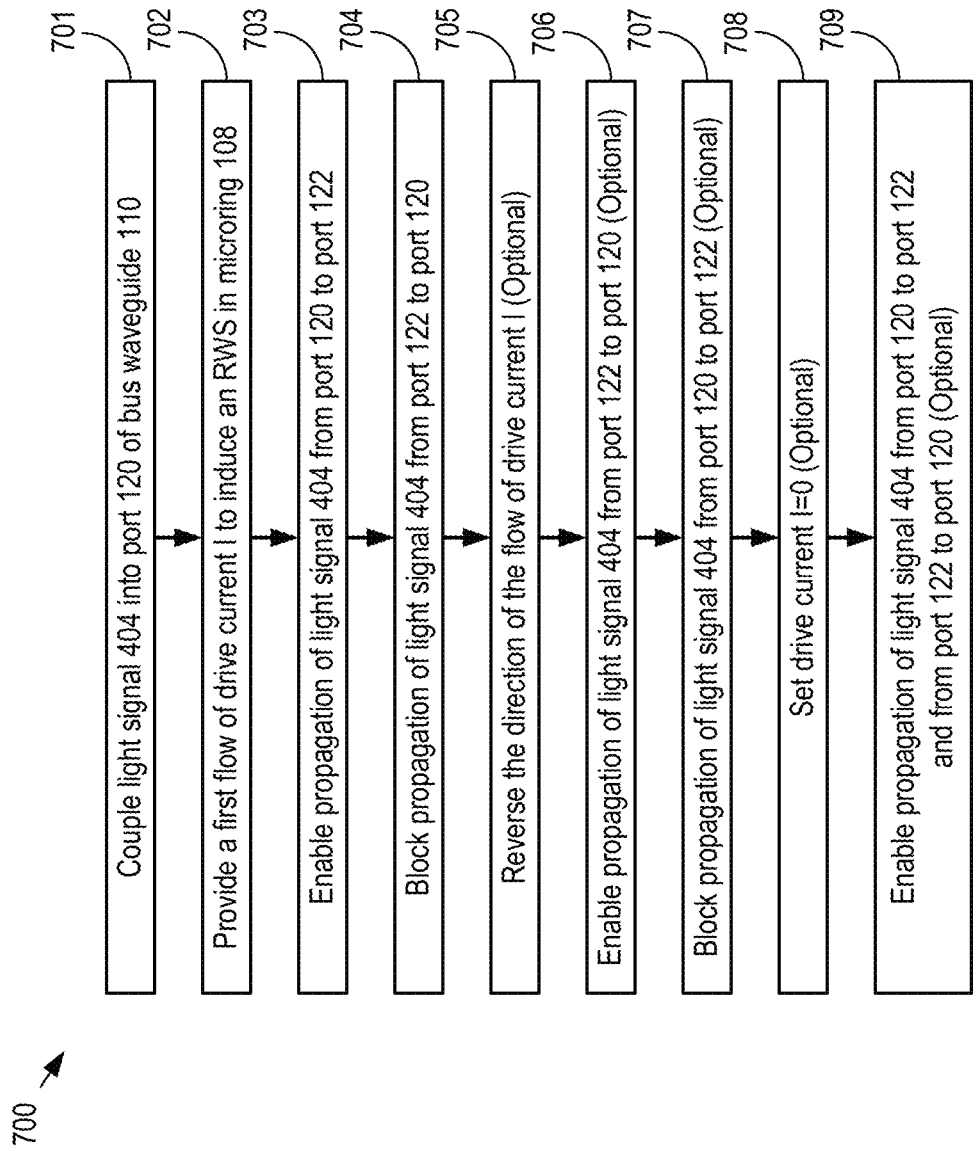

800

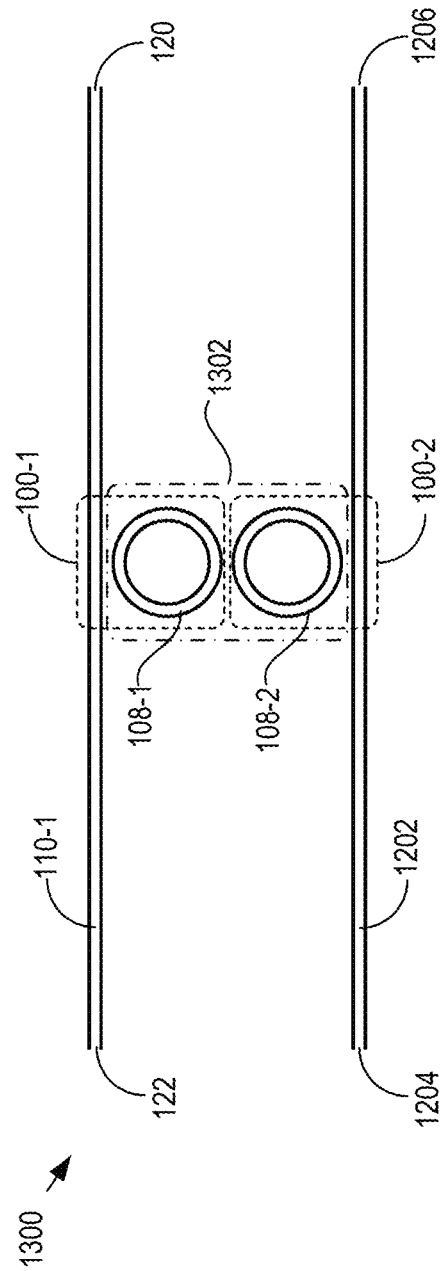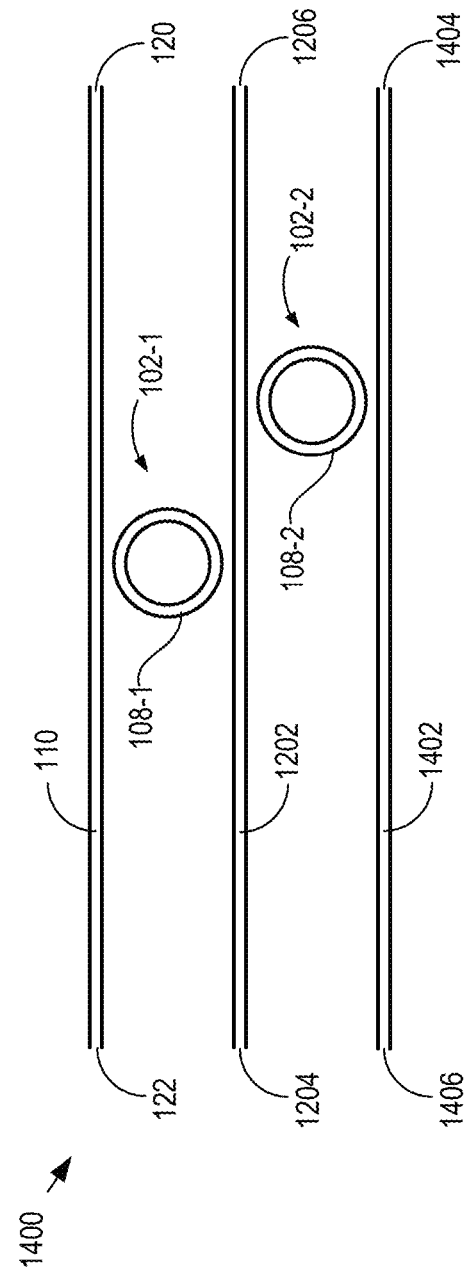

RECONFIGURABLE INTEGRATED-OPTICS-BASED NON-RECIPROCAL DEVICES

RELATED APPLICATIONS

This application claims the benefit of U.S. Provisional Application No. 62/290,341 filed Feb. 2, 2016. The entire disclosure of U.S. Provisional Application No. 62/290,341 is incorporated herein by reference.

STATEMENT REGARDING FEDERALLY SPONSORED RESEARCH

This invention was made with Government support under contract FA8650-15-M-1920 awarded by the Department of Defense. The Government has certain rights in the invention.

FIELD OF THE INVENTION

The present invention relates to integrated-optics technology in general, and, more particularly, to magneto-optically actuated integrated-optics-based switching devices.

BACKGROUND OF THE INVENTION

A photonic integrated circuit (PIC) is an optical system that is integrated on a substrate, where the optical system includes a plurality of photonic functions, such as light generation, transmission, filtering, modulation, switching, detection and the like. PICs are analogous to electronic integrated circuits; however, a PIC operates primarily in the optical domain. A typical PIC includes one or more photonic devices, such as light sources, optical modulators, detectors, etc., which are integrated with integrated-optics devices, such as planar lightwave circuit (PLC) surface waveguides, arrayed waveguide gratings, and directional couplers.

Some photonic devices, although highly desirable, have proven difficult to include in a PIC, however. Among these are non-reciprocal devices, such as optical isolators, optical circulators, Faraday rotators, etc., in which the transmission of a light signal through a surface waveguide differs based upon its propagation direction. These devices are key elements in many photonic applications, including optical telecom and datacom systems, where they are used to reduce feedback noise and enable serial integration of active and passive photonic components, and optical sensor systems such as optical gyroscopes, current sensors, etc. Unfortunately, the challenges associated with their integration in PLC technology have, thus far, created barriers to their use in practical PIC systems.

Examples of integrated-optics isolators and circulators were disclosed by Shoji, et al., in "Magneto-optical isolator with silicon waveguides fabricated by direct bonding," Appl. Phys. Lett., Vol. 92, (2008). The disclosed devices relied on the magneto-optic effect in cerium-substituted yttrium iron garnet (Ce:YIG) to generate a nonreciprocal phase shift (NRPS) in a light signal propagating through an unbalanced Mach-Zehnder interferometer (MZI) architecture using an external permanent magnet to apply the necessary magnetic field. Unfortunately, the utility of these devices was limited by the large footprint of an MZI structure and the bulkiness of permanent magnets.

In an attempt to reduce the footprint of such devices, Tien, et al., disclosed isolators based on the use of a microring in place of the MZI in "Silicon ring isolators with bonded nonreciprocal magneto-optic garnets," Optics Express, Vol. 19, 11740-11745 (2011). Unfortunately, these devices were also plagued by problems such as the challenges associated with the use of an external permanent magnet or the complex fabrication to integrate strong ferromagnetic material.

In addition, many non-reciprocal devices disclosed to date have largely relied on the application of a magnetic field transverse to a waveguide that is partially composed of a magneto-optic material, such as Ce:YiG. Magneto-optic material, however, is characterized by a notoriously high optical insertion loss, which is exacerbated by the use of a large-footprint optical layout (e.g., an MZI). Still further, the need for the inclusion of a permanent magnet to apply a magnetic field close to the magneto-optic waveguide creates problems in the eventual packaging of the PIC and limits the functionality of the PIC. Previous devices are static in their functionality due to the permanent magnet and cannot be reconfigured to perform other operations.

A simple, low-loss, easily fabricated, reconfigurable non-reciprocal device suitable for integration in a PIC remains, therefore, unrealized in the prior art.

SUMMARY OF THE INVENTION

The present invention mitigates some of the costs and disadvantages of the prior art. Specifically, the present invention enables low-loss, integrated-optics-based non-reciprocal devices, such as optical isolators, optical circulators, and the like, where the optical connections between the optical ports of the device can be rapidly reconfigured Devices in accordance with the present invention can reconfigure their optical port connectivity on a sub-nanosecond time scale.

Embodiments of the present invention exploit the fact that magneto-optic material becomes non-reciprocal when magnetized with a quasi-static magnetic field. The present invention employs an integrated electromagnet for generating the magnetic field and controls the direction and strength of the drive current through the electromagnet to enable multiple distinct states of operation in which the connectivity between their optical ports differs. For example, a non-reciprocal device having a single phase-sensitive device has three distinct operating states: (1) wherein its ports are connected in first manner when a first drive current flows through the electromagnet in a first direction; (2) wherein its ports are connected in a second manner when the first current flows through the electromagnet in the opposite direction; and (3) wherein its ports are connected in a third manner when no drive current flows through the electromagnet (i.e., the non-reciprocity of the microring is turned off). In some embodiments, multiple phase-sensitive devices, each having its own electromagnetic, are combined to enable many states of operation, where the number of operating states is given by the formula $3^N$, where N is the number of phase-sensitive devices in the non-reciprocal device.

An illustrative embodiment of the present invention is an integrated optical isolator comprising a phase-sensitive device, a layer of magneto-optic material disposed on the phase-sensitive device, and an electromagnet comprising a loop conductor disposed on the layer of magneto-optic material. The phase-sensitive device is a ring resonator includes a microring and a bus waveguide, each of which is a conventional air-cladded silicon waveguide. The layer of magneto-optic material includes a layer of Ce:YIG, which was previously grown on a separate substrate and bonded to the ring resonator. The loop conductor is a trace of electrically conductive material having substantially the same shape as the microring. The loop conductor, magneto-optic material, and microring are arranged such that the magnetic field generated by the flow of the drive current in the loop conductor is coupled with the magneto-optic layer to generate a radially directed magnetic field at the microring.

In a first operating state, drive current flowing in a first direction around the loop conductor generates a magnetic field that is directed radially outward at the microring. The presence of the magnetic field gives rise to different phase constants for the CW and the CCW propagation modes in the microring. As a result, the resonance wavelength of the microring in the CW direction is different from its resonance wavelength in the CCW direction. As a light signal propagating between the ports of the bus waveguide in the forward direction (i.e., aligned with the CCW propagation mode) passes by the coupling region between the microring and bus waveguide, light at the CCW resonance wavelength couples into the microring and is substantially removed from the light signal in the bus waveguide. As a result, propagation of that wavelength is blocked in the forward direction (i.e., the ports of the waveguide are not connected). In similar fashion, when the light signal propagates through the bus waveguide in the backward direction (i.e., aligned with the CW propagation mode), light at the CW resonance wavelength couples into the microring and is substantially removed from the light signal in the bus waveguide. The non-reciprocity of the microring, therefore, gives rise to different propagation characteristics for the forward and backward directions of the bus waveguide.

In a second operating state, the direction of the flow of the drive current through the loop conductor is reversed, which changes the direction of the magnetic field such that it is directed radially inward at the microring. This exchanges the resonance wavelengths in the CW and CCW directions and, therefore, the directions for which propagation of light at these wavelengths is enabled and blocked.

By controlling the direction of drive current flow in the electromagnet, therefore, the present invention enables the inter-port connectivity of a non-reciprocal device to be completely reconfigured between two operating states.

In a third operating state, the drive current is completely turned off. As a result, the device is no longer non-reciprocal and the resonance wavelength in the CW and CCW directions is the same (i.e., the device behaves as a conventional all-pass ring filter).

In some embodiments, the phase-sensitive device comprises a Mach-Zehnder Interferometer.

In some embodiments, the phase-sensitive device is operatively coupled with a pair of bus waveguides to collectively define a reconfigurable four-port circulator.

In some embodiments, the phase-sensitive device includes a plurality of microrings and bus waveguides, which are arranged to define reconfigurable circulators having more than four ports.

In some embodiments, the phase-sensitive device includes a coupled-microring filter having a plurality of microrings.

An embodiment of the present invention is a device (400) that is an integrated-optics-based device comprising: (1) a plurality of ports that includes a first port (120) and second port (122); (2) a first non-reciprocal element (100) including; (a) a first phase-sensitive device (102) disposed on a substrate (124); (b) a first layer (104) comprising a magneto-optic material, the first layer being disposed on the first phase-sensitive device; and (c) a first electromagnet (106) disposed on the first layer, the first electromagnet being dimensioned and arranged to generate a first magnetic field (202) at the first phase-sensitive device when a first drive current (I) flows through the first electromagnet; and (3) a first bus waveguide (110) that is dimensioned and arranged to convey a first light signal (404) characterized by a first wavelength ($\lambda_1$), the first bus waveguide comprising the first port and the second port and being operatively coupled with the first non-reciprocal element; wherein the device is reconfigurable between a plurality of operating states, each operating state defining a different inter-port connectivity between the plurality of ports; wherein the device has a first operating state of the plurality thereof when the first drive current flows in a first direction (CW); and wherein the device has a second operating state of the plurality thereof when the first drive current flows in a second direction (CCW).

Another embodiment of the present invention is a method comprising: (1) providing a device (400) that is an integrated-optics-based device that is reconfigurable between a plurality of operating states, each operating state defining a different inter-port connectivity between a plurality of ports, wherein the device includes the plurality of ports, a first non-reciprocal element (100), and a first bus waveguide (110), and wherein the device is provided such that; (a) the first non-reciprocal element includes; (i) a first phase-sensitive device (102) disposed on a substrate (124); (ii) a first layer (104) comprising a magneto-optic material, the first layer being disposed on the first phase-sensitive device; and (iii) a first electromagnet (106) disposed on the first layer, the first electromagnet being dimensioned and arranged to generate a first magnetic field (202) at the first phase-sensitive device when a first drive current (I) flows through the first electromagnet; and (b) the first bus waveguide is dimensioned and arranged to convey a first light signal (404) characterized by a first wavelength ($\lambda_1$), the first bus waveguide comprising a first port (120) and a second port (122), the plurality of ports including the first port and the second port; wherein the first non-reciprocal element and the first bus waveguide are operatively coupled; wherein the device has a first operating state of the plurality thereof when the first drive current flows in a first direction (CW); wherein the device has a second operating state of the plurality thereof when the first drive current flows in a second direction (CCW); and wherein the device has a third operating state when the magnitude of the first drive current is equal to zero; (2) providing a first control signal (406) to the first electromagnet, wherein the first control signal defines the magnitude and direction of the first drive current; and (3) controlling the first control signal to control the magnitude and direction of the flow of the first drive current through the first electromagnet.

BRIEF DESCRIPTION OF THE DRAWINGS

FIG. 7 depicts operations of a method for providing optical isolation in accordance with the present invention.

FIG. 13 depicts a schematic drawing of a top view of an alternative embodiment of a four-port circulator in accordance with the present invention.

FIG. 14 depicts a schematic drawing of a reconfigurable six-port circulator in accordance with another alternative embodiment of the present invention.

DETAILED DESCRIPTION

The present invention exploits the fact that a non-reciprocal phase shift can be induced in an integrated-optics-based phase-sensitive device, such as a ring resonator or Mach-Zehnder interferometer, by coupling the device with a magneto-optic layer and applying a magnetic field to the resultant structure. As disclosed in U.S. Pat. No. 8,396,337, which is incorporated herein by reference, the magnetic field can be generated via an electromagnet formed on top of the magneto-optic layer, which overcomes many of the problems associated with permanent-magnet-based non-reciprocal devices. In addition, since the magnitude of the drive current in an electromagnet can be controlled, the strength of the magnetic field can be tailored to achieve the desired amount of nonreciprocal phase shift (NRPS). In a resonant, ring-resonator based device, this effect produces a desired magnitude of the resonance wavelength split (RWS) induced in the device and, therefore, the CW and CCW resonance wavelengths can be selected as desired. In a non-resonant, asymmetric-MZI-based device, this effect produces a phase shift that can give rise to constructive interference for light at an operating wavelength as it travels through the MZI structure in one direction, and destructive interference for the same light as it travels through the MZI structure in the other direction.

It is an aspect of the present invention that by simply reversing the direction of current flow through the electromagnet, the positions of the CW and CCW resonance wavelengths (or directions in which constructive and destructive interference occurs) can be exchanged. Further, by simply shutting off the current flow through the electromagnet, the non-reciprocity of the non-reciprocal element is removed completely, yielding CW and CCW resonance wavelengths that are at the same wavelength (or identical constructive/destructive interference in both directions through an MZI). As a result, the present invention enables non-reciprocal devices that have multiple distinct states of operation in which different inter-port connectivity is established. For the purposes of this Specification, including the appended claims, the term "inter-port connectivity" is defined as the manner in which a plurality of optical ports of a device are optically coupled for a light signal. In other words, the inter-port connectivity of a device defines the manner in which the light signal can propagate between the optical ports of the device.

Theory of Operation

In order to further the understanding of the present invention, an overview of the operating principle of a non-reciprocal element is presented here.

Figure 1A:
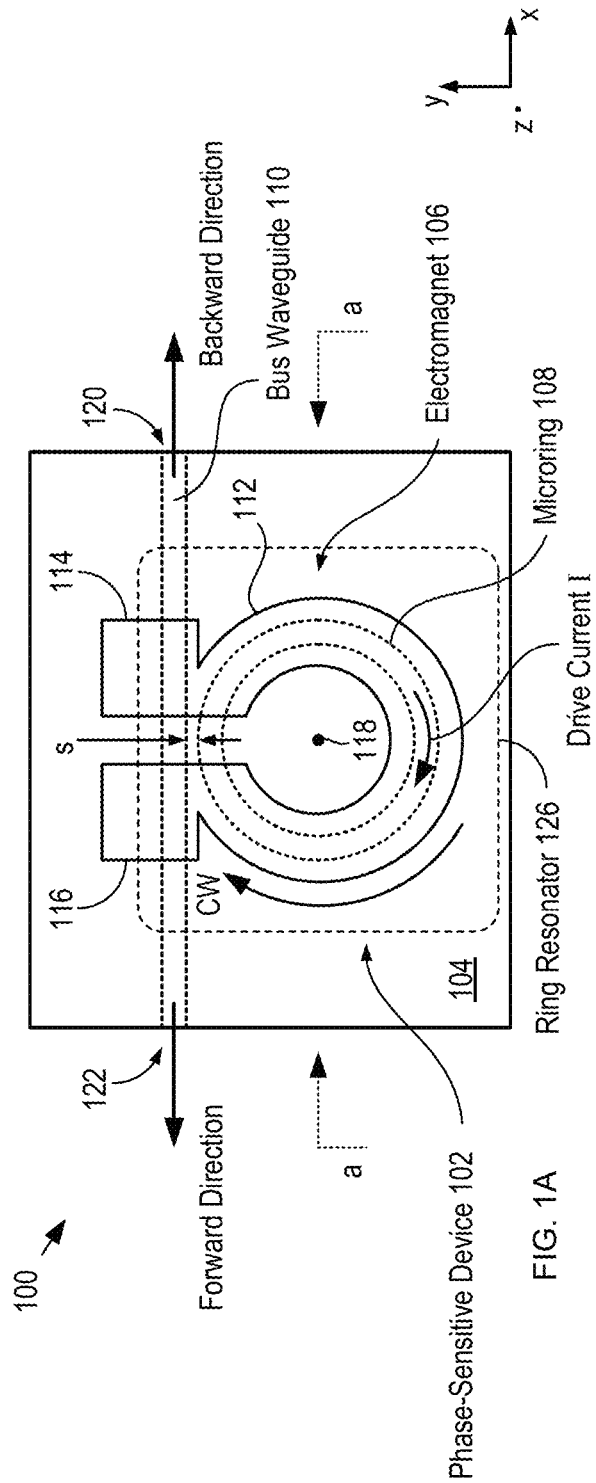
FIGS. 1A-B depict schematic diagrams of top and cross-sectional views of a generalized reconfigurable non-reciprocal element in accordance with the present invention.
Figure 1B:
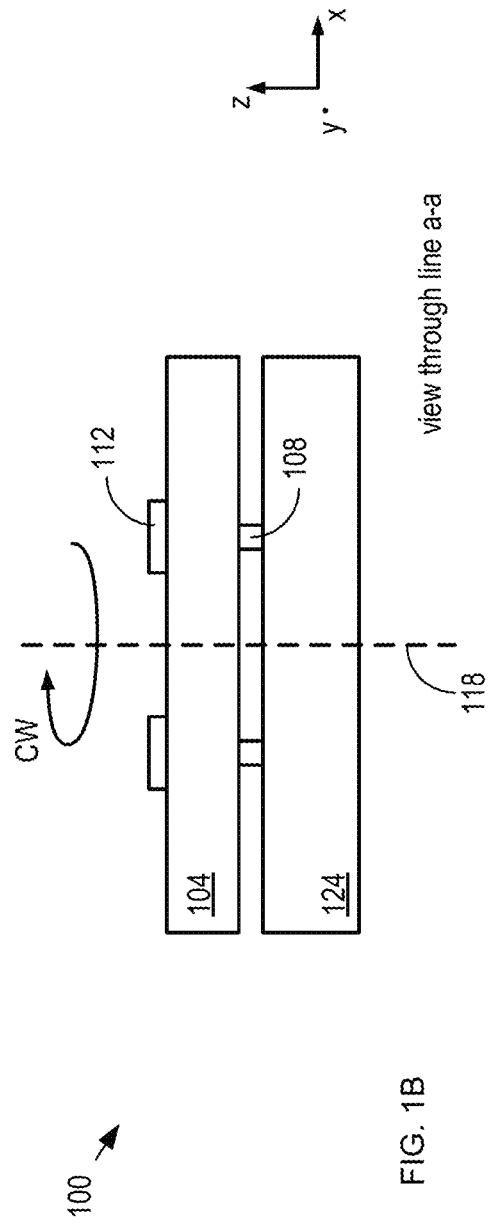

FIGS. 1A-B depict schematic diagrams of top and cross-sectional views of a generalized reconfigurable non-reciprocal element in accordance with the present invention. Non-reciprocal element 100 is a generalized device structure that includes phase-sensitive device 102, magneto-optic layer 104, and electromagnet 106. For illustrative purposes, in the depicted example, non-reciprocal element 100 is operatively coupled with bus waveguide 110.

Phase-sensitive device 102 is a microring (i.e., microring 108) that, with bus waveguide 110, defines ring resonator 126. Microring 108 and bus waveguide 110 are separated by gap s, which is sized to enable optical coupling between the two waveguide elements. The waveguide structures of the ring resonator are designed to support transverse magnetic (TM) mode light. Microring 108 is a circular waveguide that is centered about axis 118. Although microring 108 is a circular waveguide in the depicted example, in some embodiments, the microring has a shape other than a circle. For the purposes of this Specification, including the appended claims, the term "microring" is defined as any closed-loop surface waveguide capable of supporting a resonant condition. Closed-loop shapes suitable for use in a microring include circles, racetracks, ellipses, ovals, squares, rectangles, irregular shapes, and the like.

It should be noted that the present invention is applicable to any phase-sensitive waveguide structure. As a result, the principles of the present invention can be applied to optical devices other than microring structures, such as MZI structures, and the like, without departing from the scope of the present invention. One skilled in the art will recognize that embodiments of the present invention can include resonant structures, as well as non-resonant structures, as long as the non-resonant structures support a phase-sensitive criterion that can give rise to non-reciprocity in their transmission characteristics.

Ring resonator 126 is disposed on layer 124, which is a layer of silicon dioxide suitable for acting as a lower cladding for the microring and the bus waveguide.

Magneto-optic layer 104 is disposed on the ring resonator such that it acts as an upper cladding layer for the silicon core of the microring. It comprises one or more layers of material whose permittivity tensor, s, changes in the presence of a magnetic field (i.e., magneto-optic material). In some embodiments, magneto-optic layer 104 is operatively coupled with the microring without operating as its upper cladding.

Electromagnet 106 comprises loop conductor 112 and terminals 114 and 116. Loop conductor is a planar coil of electrically conductive material disposed on magneto-optic layer 104. Electromagnet 106 is a substantially circular electrical trace that is centered about axis 118 and that has the substantially the same shape as microring 108.

The operation of element 100 relies on the ability to induce the nonreciprocal phase shift effect in a magneto-optic garnet via the application of a magnetic field. In element 100, electromagnet 106 is operatively coupled with magneto-optic layer 104 and ring resonator 126 such that a flow of drive current through the electromagnet generates a magnetic field that induces a nonreciprocal phase shift in the magneto-optic layer which gives rise to difference in the wavelengths at which the microring is resonant in the CW and CCW direction. As a result, ring resonator 126 becomes non-reciprocal such that light propagating through bus waveguide 110 in the forward direction is resonant with the microring 108 at a different wavelength than light propagating through the bus waveguide in the backward direction.

Figure 2B:
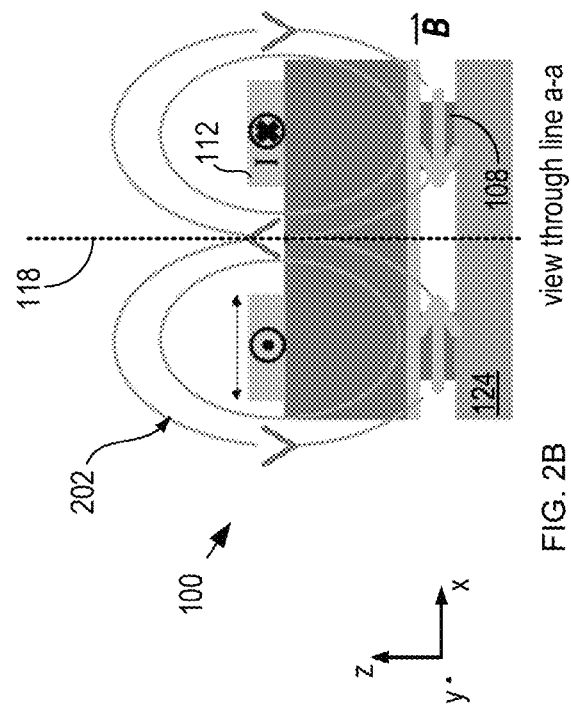
FIGS. 2A-B depict sectional views of element 100 showing the magnetic field generated by the flow of drive current I through electromagnet 106 in the clockwise and counterclockwise directions, respectively.
Figure 2A:
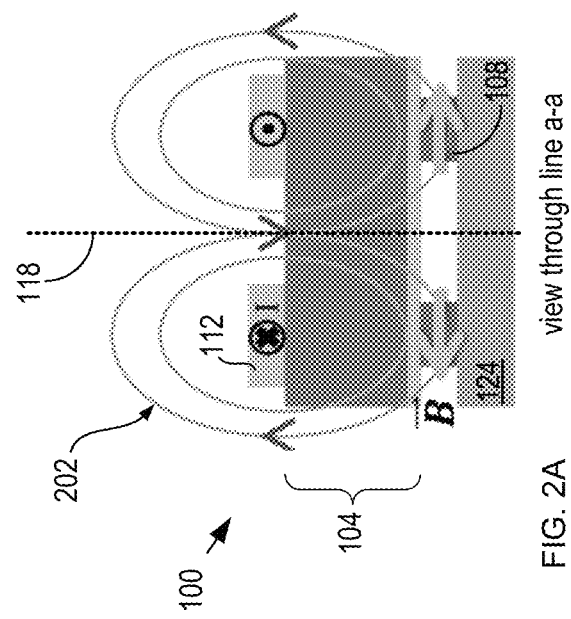

FIGS. 2A-B depict sectional views of element 100 showing the magnetic field generated by the flow of drive current I through electromagnet 106 in the clockwise and counter-clockwise directions, respectively. The views of element 100 in FIGS. 2A-B are taken through line a-a as depicted in FIG. 1A.

As shown in FIG. 2A, when drive current I flows from terminal 114 to terminal 116 (clockwise around axis 118), magnetic field 202 is generated such that it is directed radially outward at microring 108.

As shown in FIG. 2B, when drive current I flows from terminal 116 to terminal 114 (counterclockwise around axis 118), magnetic field 202 is generated such that it is directed radially inward at microring 108.

Ring resonator 126, magneto-optic layer 104, and electromagnet 106 are operatively coupled such that, when magnetic field 202 is generated at microring 108, the effective indices of its CW and CCW transverse magnetic modes become separated, giving rise to a split between the CW and CCW resonance wavelengths of the microring (i.e., an RWS).

It should be noted that the flow of drive current through electromagnet 106 also causes Joule heating, which increases the temperature of the microring. The heating of microring 108 results in a shift of the CW and CCW resonance wavelengths toward longer wavelengths (i.e., they undergo a redshift); however, it does not affect the magnitude of the induced RWS.

Figure 3:
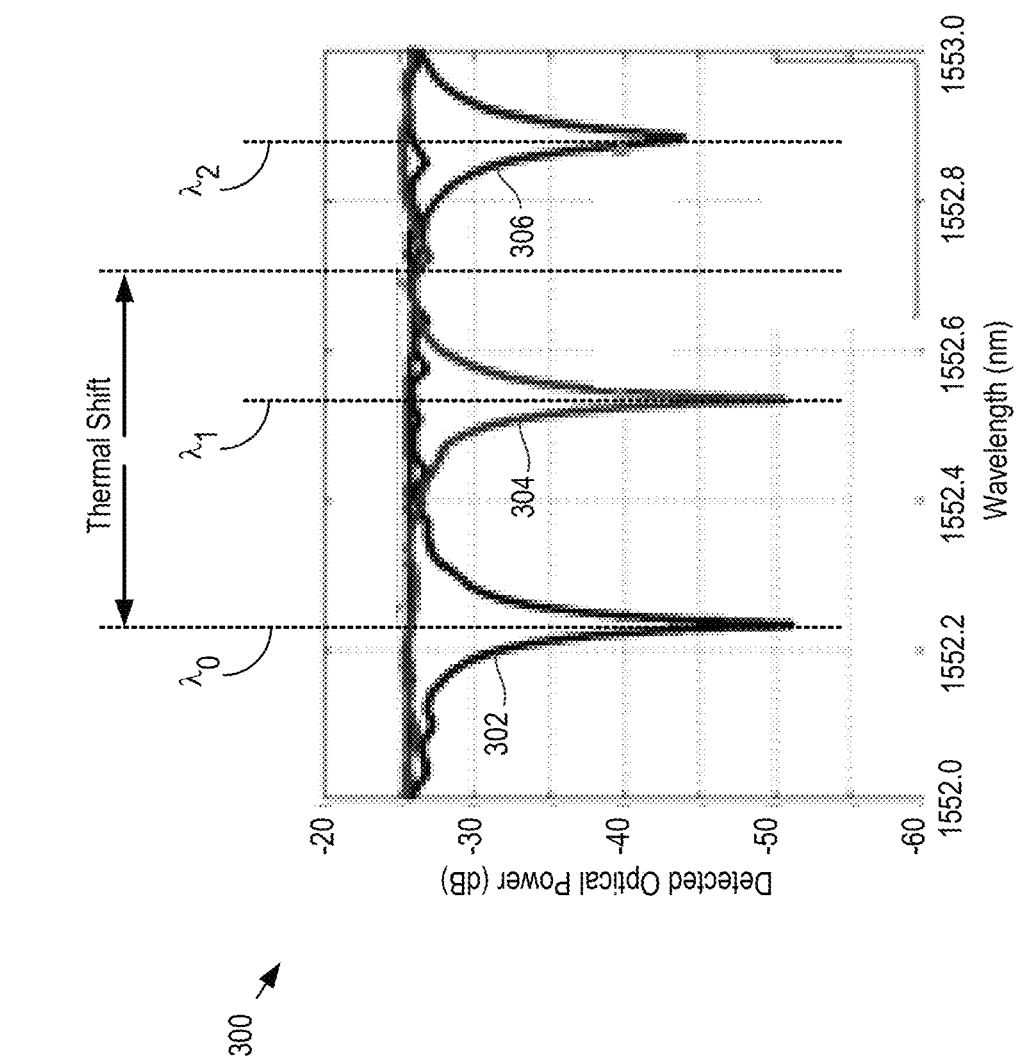
FIG. 3 depicts experimental results for the optical propagation through bus waveguide 110 over a range of wavelengths and under different drive-current conditions for non-reciprocal element 100.

FIG. 3 depicts experimental results for the optical propagation through bus waveguide 110 over a range of wavelengths and under different drive current conditions for non-reciprocal element 100. The data included in plot 300 is obtained by measuring the transmittance of bus waveguide 108 in each of the forward and backward directions while sweeping its wavelength from 1552 nm to 1553 nm.

Trace 302 indicates the propagation characteristics of bus waveguide 110 with no drive current in electromagnet 106 and, therefore, no RWS induced in microring 108. Since the propagation characteristics through the bus waveguide are reciprocal when no RWS is induced in the microring, trace 302 is measured propagation in the forward direction (i.e., light propagating from port 120 to port 122) as well as the backward direction (i.e., light propagating from port 122 to port 120). When the wavelength of the light signal matches the natural resonance wavelength, $\lambda_0$, of microring 108, it is coupled into the ring thereby removing it from the propagating signal (i.e., its propagation through bus waveguide 110 is blocked). Trace 302 indicates that, with no applied drive current, the natural resonance wavelength, $\lambda_0$, of microring 108 is approximately 1552.22 nm.

Trace 304 indicates the propagation characteristics of bus waveguide 110 in the forward direction for a CW drive current, I, of 140 mA. In the forward direction, the light signal in bus waveguide 110 couples into microring 108 only when its wavelength is equal to the CCW wavelength resonance, $\lambda_2$, of the microring (approximately 1552.88 nm). In other words, propagation from port 120 to port 122 of all light signals having wavelengths other than $\lambda_2$ is enabled, while light signals characterized by $\lambda_2$ are blocked.

Trace 306 indicates the propagation characteristics of bus waveguide 110 in the backward direction under the same drive current conditions. In the backward direction, the light signal in bus waveguide 110 couples into microring 108 only when its wavelength is equal to the CW wavelength resonance, $\lambda_1$, of the microring (approximately 1552.54 nm). In other words, propagation from port 122 to port 120 of all light signals having wavelengths other than $\lambda_1$ is enabled, while light signals characterized by $\lambda_1$ are blocked.

Plot 300 also shows that the Joule heating of microring 108 induces a redshift of its natural resonance of approximately 0.5 nm. The redshift is determined by the difference between the zero-current resonance of the microring and the average of its CW- and CCW-wavelength resonances (approximately 1552.71 nm).

The concept of employing a thin-film-coil-based electromagnet was disclosed in U.S. Pat. No. 8,396,337; however, the application of this concept was limited to fixed-port non-reciprocal devices in which the direction of current flow through the electromagnet was kept constant. It is an aspect of the present invention, however, that reversing the direction of drive current I through electromagnet 106 (i.e., generating current flow from terminal 116 to terminal 114), produces a magnetic field having the same magnitude while the Joule heating that results remains unchanged. As a result, a reversal of the direction of current flow through loop conductor 112, while maintain the same magnitude of current flow, exchanges the positions of the CW and CCW resonance wavelengths of the ring in substantially digital fashion. This enables two distinct operational modes of a non-reciprocal device, wherein the device has a first inter-port connectivity for $\lambda_1$ and $\lambda_2$ when I flows in the CW direction through electromagnet 106, and a second inter-port connectivity for $\lambda_1$ and $\lambda_2$ when I flows in the CCW direction through the electromagnet. In fact, embodiments of the present invention enable yet another, third, digitally selectable operational mode having a third inter-port connectivity, wherein both $\lambda_1$ and $\lambda_2$ are aligned with $\lambda_0$ by stopping the current flow through electromagnet 106.

Embodiments of the present invention combine the operation and structure of element 100 with additional phase-sensitive devices and/or bus waveguides to realize myriad reconfigurable integrated-optics-based non-reciprocal devices, such as optical isolators, multi-port optical circulators, etc.

Figure 4:
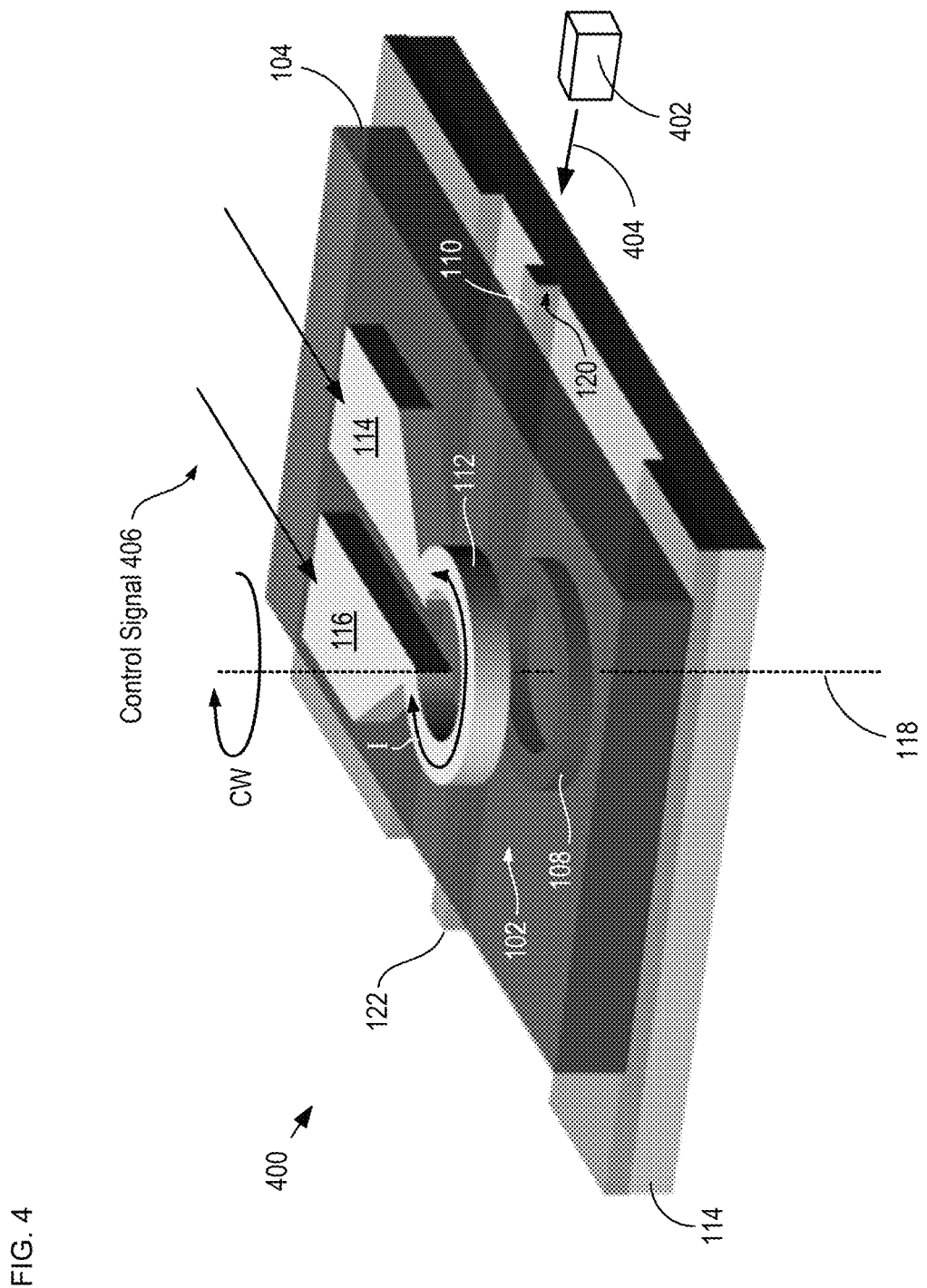
FIG. 4 depicts a schematic diagram of a perspective view of an optical isolator having three operating states in accordance with an illustrative embodiment of the present invention.

FIG. 4 depicts a schematic diagram of a perspective view of an optical isolator having three operating states in accordance with an illustrative embodiment of the present invention. Isolator 400 includes element 100, which is arranged with laser 402 such that back reflections of its light signal are blocked from coupling back into the laser and degrading its operation. Specifically, element 100 is configured to provide isolation between the forward and backward propagation of light signal 404, which is coupled into bus waveguide 110 at port 120.

Laser 402 is a conventional solid-state laser that emits light signal 404, which is TM-polarized light and is characterized by wavelength $\lambda_1$.

Figure 5:
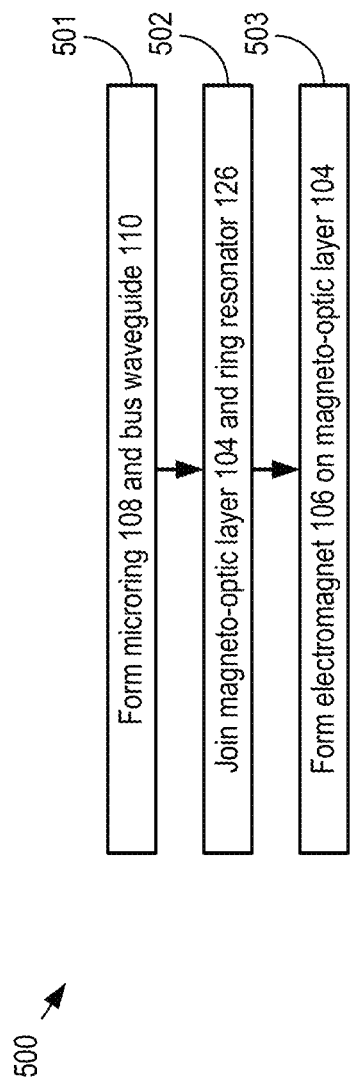
FIG. 5 depicts operations of a method for forming a non-reciprocal optical device in accordance with the present invention.

FIG. 5 depicts operations of a method for forming a non-reciprocal optical device in accordance with the present invention. Method 500 begins with operation 501, wherein the structure of microring 108 and bus waveguide 110 is defined.

Figure 6A:
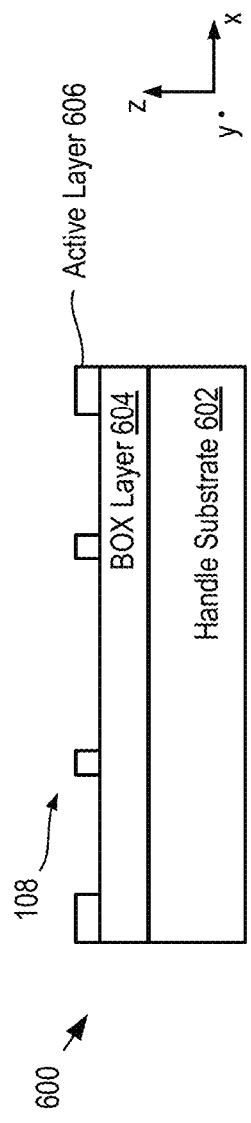
FIGS. 6A-C depict schematic drawings of cross-sectional views of isolator 400 at different stages of its fabrication.
Figure 6B:
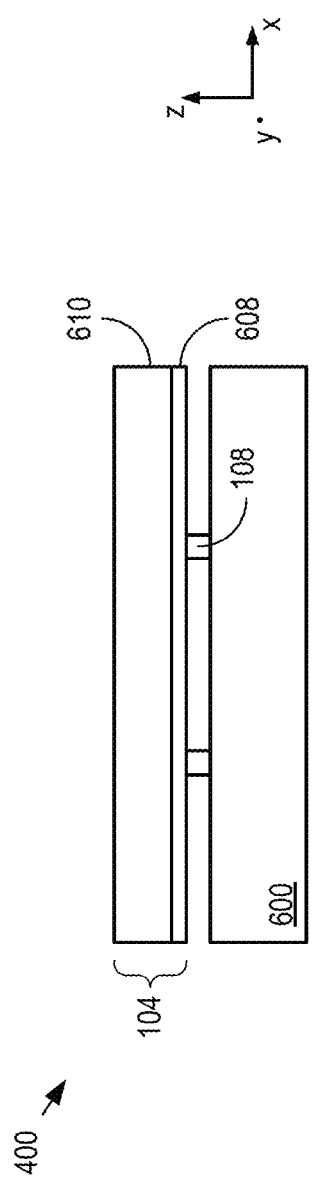
Figure 6C:
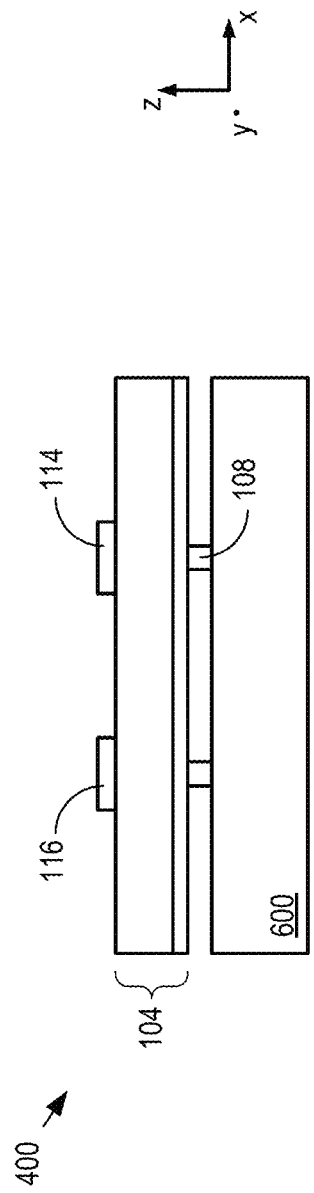

FIGS. 6A-C depict schematic drawings of cross-sectional views of isolator 400 at different stages of its fabrication. FIGS. 6A-C are described herein with continuing reference to FIGS. 4 and 5.

Microring 108 and waveguide 110 are defined by etching through active layer 604 of conventional silicon-on-insulator (SOI) substrate 600, which includes handle substrate 602, buried oxide (BOX) layer 604, and active layer 606.

Handle substrate 602 is a conventional silicon wafer whose top surface has been oxidized to form BOX layer 604. In some embodiments, substrate 602 is a different substrate suitable for planar processing (e.g., a compound semiconductor wafer, etc.).

BOX layer 604 is a layer of silicon dioxide having a thickness sufficient to act as a lower cladding for silicon waveguides disposed on it, as well as substantially isolate optical modes in the waveguides from the underlying handle substrate. In some embodiments, BOX layer 604 includes a different material/structure suitable for acting as a lower cladding for the waveguide structures. For example, in some embodiments, BOX layer 604 is a glass substrate. Box layer 604 defines layer 124, described above and with respect to FIGS. 1A-B.

In the depicted example, active layer 606 is a layer of single-crystal silicon having a thickness suitable for operation as the core of microring 108 and bus waveguide 110. In the depicted example, active layer 606 has a thickness of approximately 230 nanometers (nm); however, in some embodiments, active layer 606 has a different thickness and/or comprises a different material suitable for use as a core layer of a surface waveguide.

Active layer 606 is etched to define phase-sensitive device 102. In the depicted example, the phase-sensitive device includes microring 108 and bus waveguide 110, which are silicon-based channel waveguides having a thickness of approximately 230 nm and a width of approximately 600 nm. Each is designed to be operative for TM-polarized light. Although the illustrative embodiment employs TM-polarized waveguides, it will be clear to one skilled in the art, after reading this Specification, how to specify, make, and use alternative embodiments of the present invention that comprise waveguides that are designed for operation with transverse-electric (TE) polarized light, wherein the magneto-optic layer is disposed on one of the inner radius or outer radius of the microring. One skilled in the art will recognize that other waveguide structures, dimensions, and/or materials can be used for waveguides in accordance with the present invention.

FIG. 6A depicts a sectional view of isolator 400 after the formation of the waveguide structures of phase-sensitive device 102 (in the depicted example, ring resonator 102).

At operation 502, magneto-optic layer 104 is bonded on top of phase-sensitive device 102 via oxygen-plasma-assisted bonding. In some embodiments, another conventional bonding technique is used to join magneto-optic layer 104 and ring resonator 106.

Magneto-optic layer 104 comprises Ce:YIG layer 608 and substituted gadolinium gallium garnet (SGGG) substrate 610. Ce:YIG layer 608 is disposed on SGGG substrate 610 and has a thickness of approximately 400 nm. The magneto-optic layer is bonded to the ring resonator such that Ce:YIG layer 608 is in contact with microring 108 and bus waveguide 110. It should be noted that, in some embodiments, an oxide layer is formed between layer 104 and the silicon waveguides (either proactively to facilitate bonding, or inherently during to $O_2$ plasma activation). The NRPS effect degrades quickly as the thickness of this oxide layer increases, however; therefore, it is desirable to keep it as thin as possible—preferably around 10 nm.

At operation 503, to strengthen the bond, the bonded layer stack is annealed at 200° C. for six hours while 3 MPa of pressure is applied.

Preferably, magneto-optic layer 104 is thin to facilitate good coupling between a magnetic field generated by electromagnet 106 and microring 108. As a result, at optional operation 504, the thickness of the SGGG substrate 610 is reduced to a thickness of approximately 5 microns and the thickness of the Ce:YIG layer is approximately 400 nm. It should be noted that magneto-optic layer 110 can include other materials and/or have a different thickness without departing from the scope of the present invention. Preferably, all of these materials are low loss at the operating wavelength of ring resonator 126. It is known, however, that Ce:YiG typically has a relatively large propagation loss of −60 dB/cm for many wavelengths of interest.

FIG. 6B depicts a sectional view of isolator 400 after magneto-optic layer 104 and active layer 606 have been bonded and annealed.

At operation 505, fabrication of isolator 400 is completed with the formation of electromagnet 106 on magneto-optic layer 104. As discussed above, electromagnet 106 includes loop conductor 112 and terminals 114 and 116. In the depicted example, loop conductor 112 is a substantially circularly shaped trace of gold having a thickness of approximately 1.5 microns and a width of approximately 3 microns. In some embodiments, electromagnet 106 comprises an electrically conductive material other than gold, such as a different metal (e.g., aluminum, tungsten, titanium, etc.) or non-metallic conductor. Typically, electromagnet 106 is formed such that it has substantially the same shape as microring 108.

FIG. 6C depicts a sectional view of completed isolator 400.

Preferably, the thickness and width of microring 108, and bus waveguide 110, as well as the thickness of magneto-optic layer 104, are selected to substantially maximize the induced RWS and the isolation induced in isolator 400.

FIG. 7 depicts operations of a method for providing optical isolation in accordance with the present invention. Method 700 begins with operation 701, wherein light signal 404 is coupled into port 120 of bus waveguide 110.

At operation 702, element 100 is put into a first operating state by inducing a resonance wavelength shift in microring 108 via control signal 406. Control signal 406 is applied at terminals 114 and 116 such that drive current I flows in the clockwise direction through the loop conductor of electromagnet 106, as discussed above and with respect to FIGS. 1-3. By virtue of the induced RWS, microring 108 develops a CW resonance mode at $\lambda_1$ and a CCW resonance mode at $\lambda_2$.

At operation 703, isolator 400 enables the propagation of light signal 404 from port 120 to port 122. The operating wavelength of light signal 404 is $\lambda_1$; therefore, it is aligned with the CW resonance wavelength of microring 108 and unaligned with its CCW resonance wavelength. As a result, in the forward direction, the light signal is off-resonance with the CCW resonance wavelength. Propagation of light signal 404 from port 120 to port 122 is enabled, therefore, because its optical energy is not coupled into ring resonator 126 and remains in the bus waveguide.

At operation 704, isolator 400 blocks the propagation of light signal 404 from port 122 to port 120. In the backward direction, light signal 404 is on-resonance with the CW resonance wavelength of microring 108. As a result, the optical energy of light signal 404 couples into the microring, effectively removing the light signal from bus waveguide 110. In some embodiments, the optical energy coupled into the microring is dissipated by the microring. In other words, isolator 400 blocks propagation of light signal 404 from port 122 to port 120. Optical isolators in accordance with the present invention readily attain attenuation levels in the blocking direction of greater than 10 dB and attenuations of nearly 40 dB have been demonstrated in some cases. One skilled in the art will appreciate that the level of attenuation necessary to "block" a light signal is application dependent.

Figure 8:
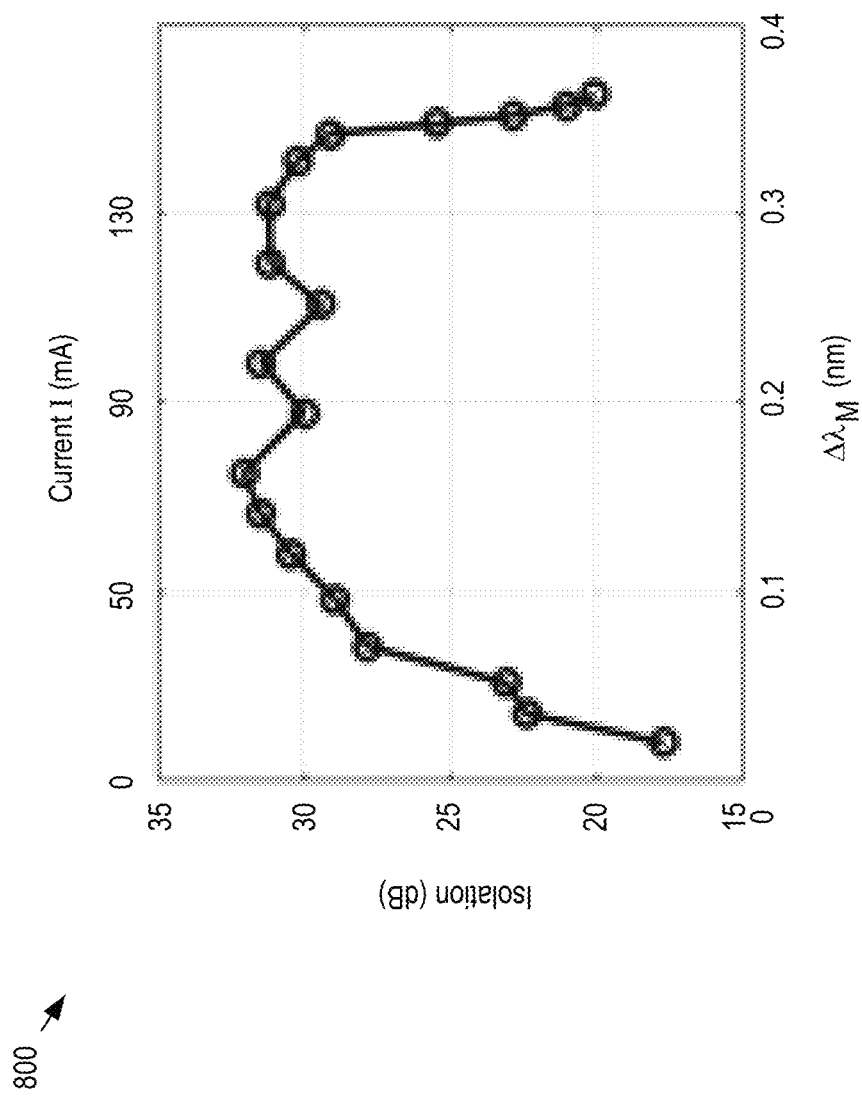
FIG. 8 depicts measured optical isolation in bus waveguide 110 as a function of drive current flow in electromagnet 106.

FIG. 8 depicts measured optical isolation in bus waveguide 110 as a function of current flow in electromagnet 106. Plot 800 demonstrates that optical isolation greater than 25 dB is attained for drive currents over the range of approximately 40 mA to approximately 180 mA.

At optional operation 705, element 100 is put into a second operating state by applying control signal 406 at terminals 114 and 116 such that the flow of drive current I through electromagnet 106 is reversed (i.e., it has the same magnitude but flows in the counter-clockwise direction). As a result, the direction of magnetic field 202 is flipped such that it is directed radially inward at microring 108. The change in orientation of the magnetic field exchanges the CW and CCW resonance wavelengths for microring 108.

At operation 706, the propagation of light signal 404 from port 122 to port 120 is enabled by the fact that the light signal is now unaligned with the CW resonance wavelength of microring 108.

At operation 707, the propagation of light signal 404 from port 120 to port 122 is blocked by the fact that the light signal is now aligned with the CCW resonance wavelength of microring 108.

At operation 708, current flow I in electromagnet 106 is stopped (i.e., I is set to zero). As a result, microring 108 becomes reciprocal and its CW and CCW resonance wavelengths are equal to the natural resonance wavelength, $\lambda_0$, of the microring. As discussed above, $\lambda_1$ is offset from $\lambda_0$ by the magnitude of the redshift induced by Joule heating in microring 108. As a result, light signal 404 is unaligned with the resonance wavelength of microring 108.

At operation 709, the propagation of light signal 404 is enabled in both directions between ports 120 and 122.

In some applications, it is beneficial to provide an optical-isolation bandwidth that is larger than that provided by a single-microring-based isolator, such as isolator 400. To effect a larger isolation bandwidth, microring 108 can be replaced by a cascaded-ring or multi-microring configuration, wherein the respective CW and CCW resonance wavelengths of the microrings are aligned.

Figure 9:
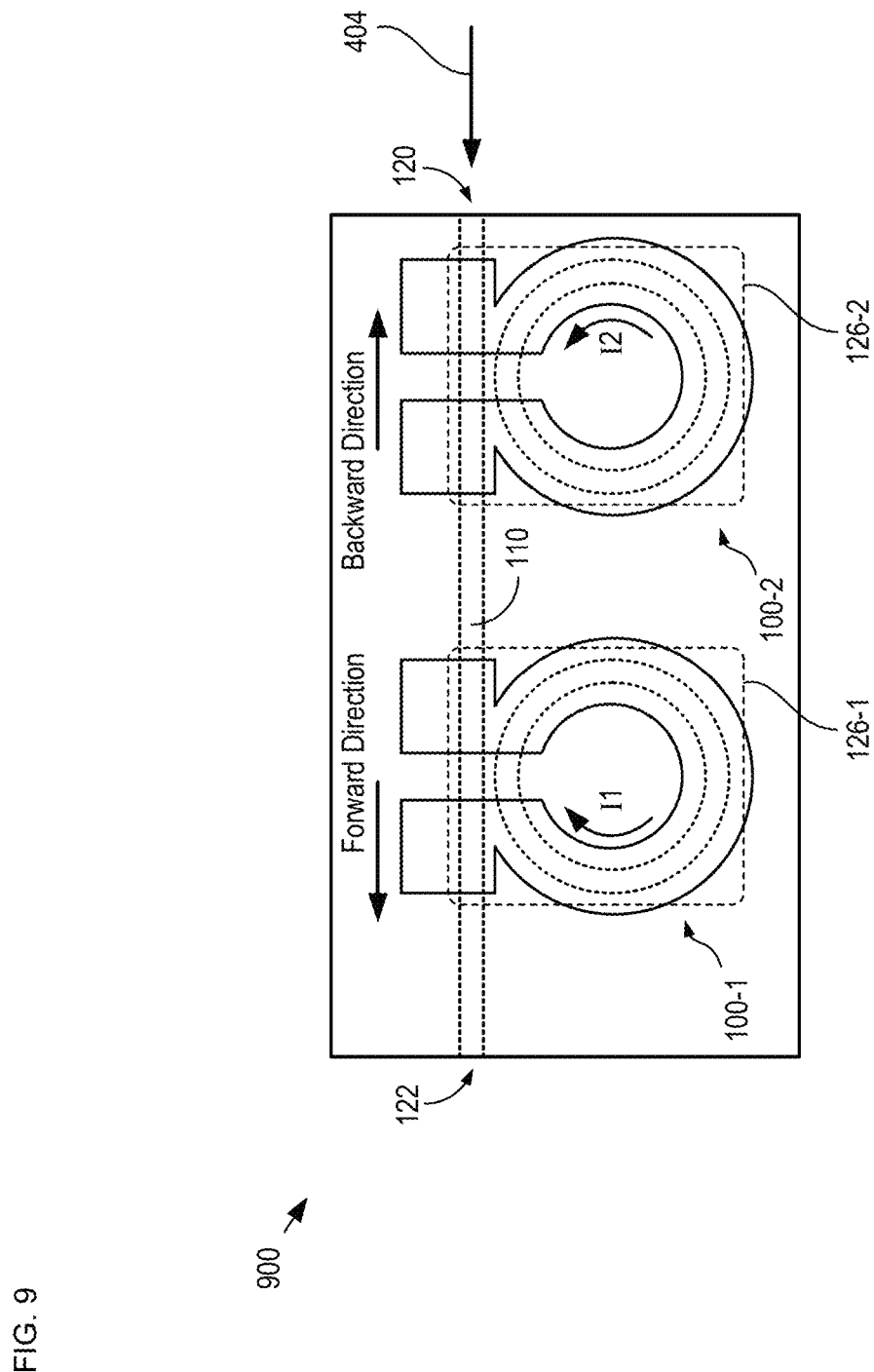
FIG. 9 depicts a schematic drawing of an isolator having an expanded isolation bandwidth in accordance with an alternative embodiment of the present invention.

FIG. 9 depicts a schematic drawing of an isolator having an expanded isolation bandwidth in accordance with an alternative embodiment of the present invention. Isolator 900 is analogous to element 100 described above; however, isolator 900 includes a pair of isolators 400 cascaded along bus waveguide 110.

Isolator 400-1 is driven with a CW drive current I1 such that its CW resonance wavelength is aligned with $\lambda_1$, which is the operating wavelength of light signal 404, as described above.

Isolator 400-2, on the other hand, is driven with a CCW drive current I2 such that the positions of the CW and CCW resonance wavelengths of its microring are reversed. Further, the magnitude of at least one of I1 and I2 is controlled to effect a different thermally induced redshift on its CW and CCW resonances so that its CW resonance wavelength is also aligned with $\lambda_1$.

As a result, light signal 404 passes through isolator 900 in the forward direction without significant attenuation, while undergoing significant attenuation at each of isolators 400-1 and 400-2 as it passes through bus waveguide in the backward direction. The isolation achieved for isolator 900, therefore, is approximately double what is achieved by a single-ring isolator.

Typically, the number of operating states for a non-reciprocal device in accordance with the present invention is determined by the number of combinations of independently controllable current flows (i.e., CW, CCW, and zero-current flows) among the non-reciprocal elements included in the device. The number of operating states for a typical device, therefore, is given by the formula 3N, where 3 is the number of current-flow states and N is the number of independently controllable non-reciprocal elements. For proper operation of isolator 900, however, the current flows of I1 and I2 are inter-dependent for the operating wavelength of the device; therefore, there is only one independently controllable current flow for the isolator. As a result, isolator 900 has three operating states, which are analogous to those of isolator 400 described above.

It should be noted that, while it is preferable to provide drive currents I1 and I2 such that they flow in opposite directions to facilitate aligning their resonance wavelengths for light signal 440, isolator 900 can be driven such that drive currents I1 and I2 flow in the same direction. In some embodiments, a heater element is included to tune to resonance wavelength in one of microrings 108-1 and 108-2.

Figure 10:
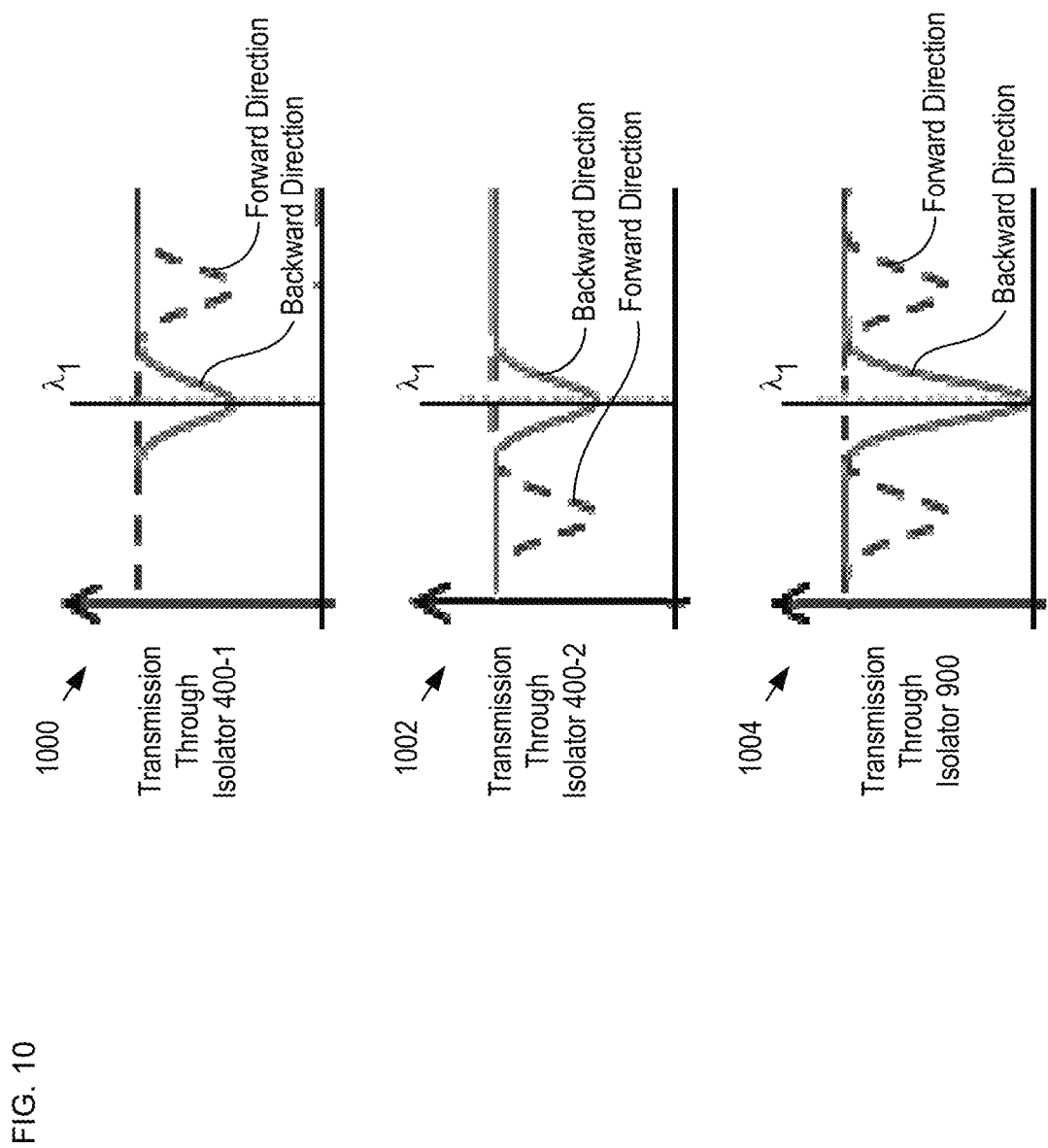
FIG. 10 depicts the optical transfer functions of each of isolators 400-1 and 400-2, as well as the complete isolator 900, in the forward and backward directions.

FIG. 10 depicts the optical transfer functions of each of isolators 400-1 and 400-2, as well as the complete isolator 900, in the forward and backward directions.

As seen in plots 1000 and 1002, light signal 404 passes through each of isolators 400-1 and 400-2 with little or no attenuation in the forward direction but is significantly attenuated when passing through the isolator in the backward direction.

Plot 1004 shows that the attenuation of light signal 404 in the backward direction is substantially equal to the sum of the attenuations achieved in isolators 400-1 and 400-2.

One skilled in the art will recognize that additional single-ring isolators can be included in isolator 900 by tuning their CW and CCW resonances via controlling the magnitude of their RWS (by controlling the magnitude of the generated magnetic field), as well as the Joule heating in each element given by the magnitude of their drive currents. As a result, the number of cascaded isolators included in isolator 900 is limited primarily only by practical considerations regarding insertion loss in the forward direction.

In some embodiments, electromagnet 106 includes a plurality of loop conductors that enable the electromagnet to generate magnetic field 202 with lower drive current I.

Figure 11B:
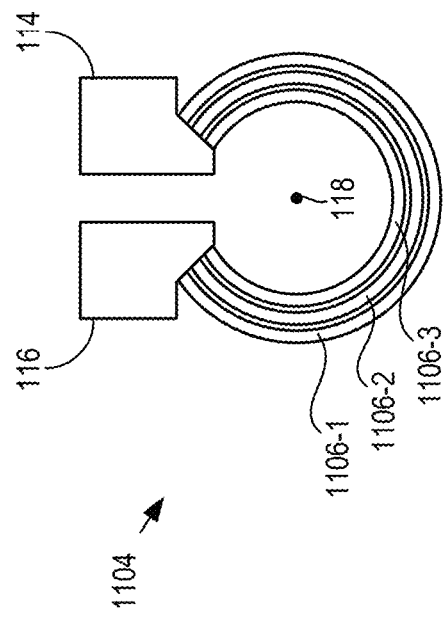
FIGS. 11A-B depict schematic drawings of alternate electromagnet designs in accordance with the present invention.
Figure 11A:
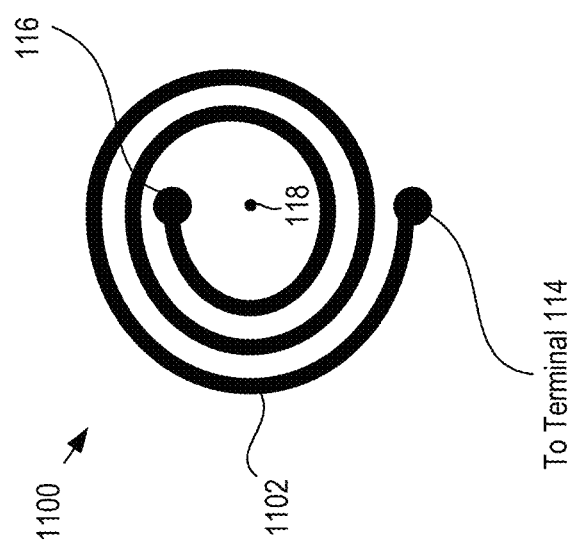

FIGS. 11A-B depict schematic drawings of alternate electromagnet designs in accordance with the present invention.

Electromagnet 1100 comprises a spiral of electrically conductive material, where each spiral is substantially centered about axis 118. As drive current flows through loop conductor 1102, each loop of the spiral generates a magnetic field that is oriented about the trace in the same manner. The plurality of magnetic fields generated by the spirals of loop conductor 1102 collectively defines magnetic field 202.

Electromagnet 1104 comprises loop conductors 1106-1 through 1106-3, which are electrically connected in parallel between terminals 114 and 116 and arranged such that each is substantially concentric about axis 118. As drive current flows through each of the individual loop conductors, it generates a magnetic field that is oriented in the same manner about the trace. The plurality of magnetic fields generated by loop conductors 1106-1 through 1106-3 collectively defines magnetic field 202.

One skilled in the art will recognize, after reading this Specification, that myriad alternative designs for electromagnet 106, such as multiple planar coil layers that are interconnected by vias, etc., are within the scope of the present invention.

Figure 12:
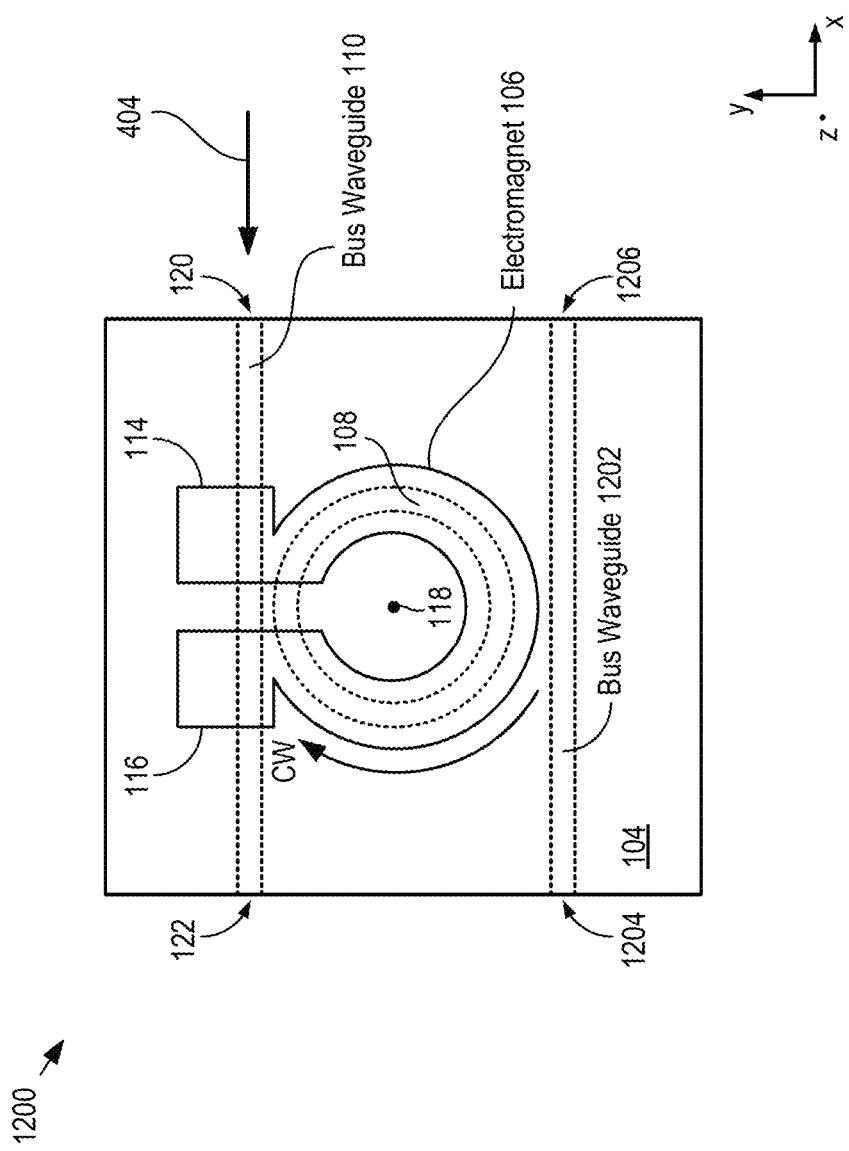
FIG. 12 depicts a schematic diagram of a top view of a non-reciprocal device in accordance with another alternative embodiment of the present invention.

FIG. 12 depicts a schematic diagram of a top view of a non-reciprocal device in accordance with another alternative embodiment of the present invention. Circulator 1200 is a four-port optical circulator that includes the structure of isolator 400, as well as additional bus waveguide 1202. In the depicted example, circulator 1200 is operative as a silicon-microring-based optical add-drop wavelength filter for controlling the propagation of light signals between its four ports.

Circulator 1200 has three states of operation that are analogous to the operating states of isolator 400 described above. The operating states of circulator 1200 are described as follows.

In operating state 1, electromagnet 106 is driven with a CW drive current flow I (i.e., from terminal 114 to terminal 116). As a result, magnetic field 202 is directed outward at microring 108, which aligns the wavelength of light signal 404, $\lambda_1$, with the CW resonance mode of the microring, as discussed above. Forward propagating light signal 404 is off-resonance with microring 106, therefore, resulting in it bypassing ring resonator 126 without coupling into it. This enables its selective propagation from port 120 to port 122. In addition, propagation of light signal 404 is selectively enabled from port 122 to port 1204, from port 1204 to port 1206, and from port 1206 to port 120. All other inter-port connectivity is blocked.

In operating state 2, electromagnet 106 is driven with a CCW flow of drive current I and magnetic field 202 is directed inward at microring 108. As a result, the resonance wavelengths of the microring are exchanged and the wavelength of light signal 404, $\lambda_1$, is aligned with the CCW resonance mode of the microring. In this state, the propagation of the light signal is selectively enabled from port 120 to port 1206, from port 1206 to port 1204, from port 1204 to port 122, and from port 122 to port 120. Again, all other inter-port connectivity is blocked.

In operating state 3, drive current I is set to zero and the device behaves as a conventional add-drop filter with no non-reciprocal properties. In state 3, the wavelength of light signal 404, $\lambda_1$, is unaligned with the resonance wavelength of the microring and light signal 404 propagates without significant attenuation in both directions between ports 120 and 122, as well as in both directions between ports 1204 and 1206. In other words, for light signal 404, port 120 is optically coupled with port 122 and port 1204 is optically coupled with port 1206.

FIG. 13 depicts a schematic drawing of a top view of an alternative arrangement for a four-port circulator in accordance with the present invention. Circulator 1300 includes coupled-microring filter 1302 and bus waveguides 110 and 1202.

Filter 1302 includes elements 100-1 and 100-2, which comprise microrings 108-1 and 108-2 and their corresponding electromagnets 106-1 and 106-2 (not shown), respectively.

The operating states for circulator 1300 are analogous to those described above for circulator 1200. In circulator 1300, however, they are established by controlling the RWS in each of microrings 108-1 and 108-2 such that wavelength $\lambda_1$ propagates in opposite directions in the microrings (i.e., the flows of one drive current depends on the other). For identical elements, the drive current in the two electromagnets have the same magnitude but flow in opposite directions. In practice, however, elements 100-1 and 100-2 are not usually identical; therefore, the drive current of at least one of the elements must be adjusted to compensate for their differences.

As discussed above and with respect to isolator 900, the number of operating states for a typical non-reciprocal device in accordance with the present invention is given by the formula 3N, where N is the number of non-reciprocal elements having independently controllable current flows. In circulator 1300, as in isolator 900, the current flows in non-reciprocal elements 100-1 and 100-2 are inter-dependent; therefore, there is only one independently controllable current flow for the circulator. As a result, circulator 1300 has three operating states, which are analogous to those of circulator 1200 described above.

Filter 1302 affords circulator 1300 greater optical isolation, as well as larger isolation bandwidth.

One skilled in the art will recognize, after reading this Specification, filter 1302 can include more than two microrings to define higher-order coupled-microring filters without departing from the scope of the present invention.

FIG. 14 depicts a schematic drawing of a reconfigurable six-port circulator in accordance with another alternative embodiment of the present invention. Circulator 1400 includes circulator 1200, as well as additional microring 108-2 and bus waveguide 1402, which includes ports 1404 and 1406. One skilled in the art will recognize that circulator 1400 includes magneto-optic layer 104, as well as electromagnets operatively coupled with each of microrings 108-1 and 108-2; however, for clarity, these elements are not shown in FIG. 14.

By virtue of the fact that it includes two independently controllable non-reciprocal elements, circulator 1400 has more operating states than circulators 1200 and 1300. As discussed above, the number of operating states for a non-reciprocal device is given by the formula 3N, where N is the number of its non-reciprocal elements that have an independently controllable current flow. Circulator 1400, therefore, has nine unique operating states, each defining a different inter-port connectivity between ports 120, 122, 1204, 1206, 1404, and 1406.

In a first operating state, a CW flow of drive currents I1 and I2 provides outwardly directed magnetic fields at each of microrings 106-1 and 106-2, enabling circulation of light from port 120 to port 122, from port 122 to port 1204, from port 1204 to port 1406, from port 1406 to port 1404, from port 1404 to port 1206, and from port 1206 to port 120.

In a second operating state, the reversal of the direction of the flow of both drive currents results in inwardly directed magnetic fields at each of microrings 108-1 and 108-2, which gives rise to circulation of light from port 120 to port 1206, from port 1206 to port 1404, from port 1404 to port 1406, from port 1406 to port 1204, from port 1204 to port 122, and from port 122 to port 120.

In a third operating state, no drive current flows in either electromagnet, turning off the non-reciprocity and establishing $\lambda_0$ as the resonance wavelength for both rings (assuming no fabrication-based differences between them). As a result, light signal 404 propagates straight through each bus waveguide in each direction since its wavelength, $\lambda_1$, is off-resonance with the rings. The inter-port connectivity for light signal 404 in the third operating state of circulator 1400, therefore, is established as between ports 120 and 122, between ports 1204 and 1206, and between ports 1404 and 1406.

In a fourth operating state, driving the electromagnets to realize an outwardly directed magnetic field at microring 108-1 and an inwardly directed magnetic field at microring 108-2 gives rise to circulation of light from port 120 to port 122, from port 122 to port 1204, from port 1204 to port 1206, from port 1206 to port 1404, from port 1404 to port 1406, and from port 1406 to port 120.

In a fifth operating state, driving the electromagnets to realize an inwardly directed magnetic field at microring 108-1 and an outwardly directed magnetic field at microring 108-2 gives rise to circulation of light from port 120 to port 1406, from port 1406 to port 1404, from port 1404 to port 1206, from port 1206 to port 1204, from port 1204 to port 122, and from port 122 to port 120.

It will be apparent to one skilled in the art, after reading this Specification, how to realize the other four operating states of circulator 1400.

Figure 15:
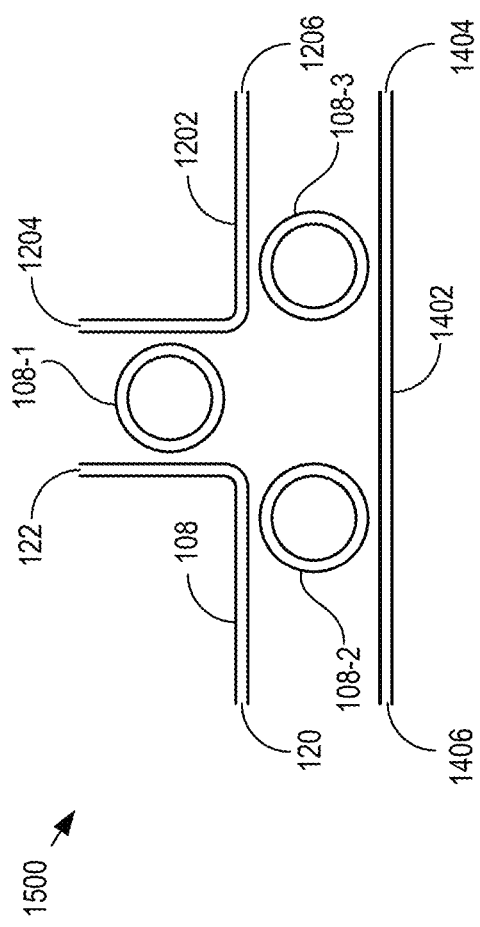
FIG. 15 depicts an alternate layout of the microrings and bus waveguides of circulator 1400.

FIG. 15 depicts an alternate layout of the microrings and bus waveguides of circulator 1400. In some embodiments, an odd number of ports is achieved by using a loop mirror at one of the ports.

It should be noted that the number of circulator ports that can be included in non-reciprocal devices in accordance with the present invention is theoretically unlimited. In practice, however, optical loss and optical crosstalk considerations dictate the number of ports possible for a given application.

In addition, in some embodiments, the inclusion of multiple microring devices require that at least some of the microrings have a tuning capability so that the resonances of all of the rings can be aligned in light of manufacturing variations. In some embodiments, this tuning capability is attained via thermal tuning. In some embodiments, thermal tuning is achieved by ohmic heating in the loop conductors. In some embodiments, thermal tuning is achieved via a separate heating element that is operatively coupled with the microring. Preferably, these separate heating elements do not contribute magnetic fields within the vicinity of the microring. Alternatively, in some embodiments, the heating elements are designed such that their contributions to the magnetic field in the microring cancel themselves out over the round trip propagation in the ring. The use of a separate heating element affords such embodiments with independent control over each of the resonance and the induced magnetic field at non-reciprocal element in the non-reciprocal device. Furthermore, different wavelength tuning mechanisms (i.e stress-optic, electro-optic, etc.) can be used to set the CW and CCW resonance wavelengths independent of the RWS without departing from the scope of the present invention.

Figure 16:
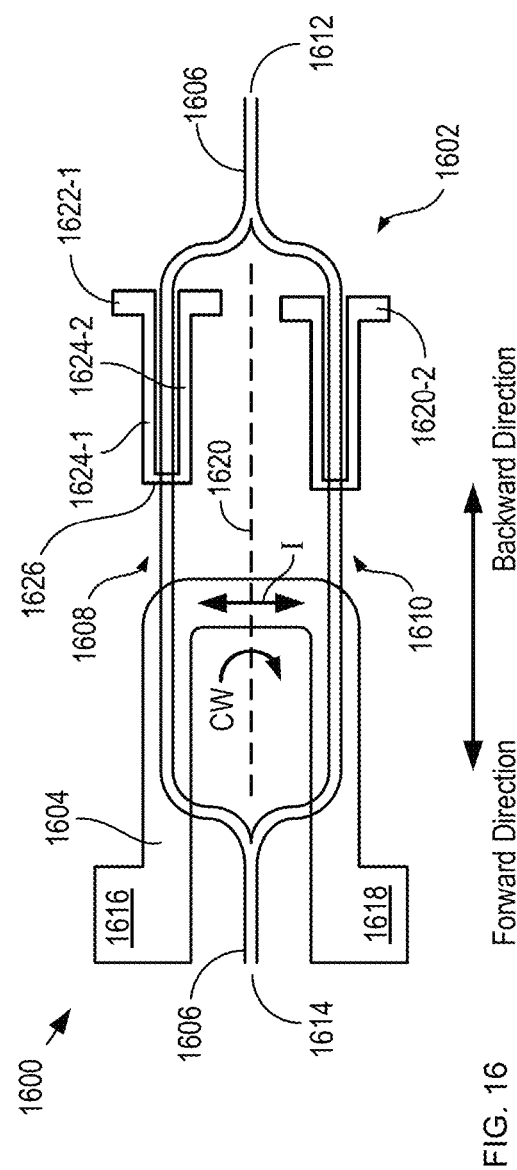
FIG. 16 depicts a schematic drawing of a top view of an isolator in accordance with another alternative embodiment of the present invention.

FIG. 16 depicts a schematic drawing of a top view of an isolator in accordance with another alternative embodiment of the present invention. Isolator 1600 includes phase-sensitive device 1602, electromagnet 1604, magneto-optic layer 104 (not shown), bus waveguide 1606, and heaters 1622-1 and 1622-2 (referred to, collectively, as heaters 1622). Isolator 1600 establishes inter-port connectivity for a light signal propagating between two ports, where the inter-port connectivity is based on a magnetic field generated by electromagnet 1604. Isolator 1600 has operating states that are analogous to those described above and with respect to isolator 400.

Phase-sensitive device 1602 is an arrangement of bus waveguides that are analogous to bus waveguide 110, where the arrangement defines an asymmetric MZI configuration that includes arms 1608 and 1610, which are connected at either end via conventional 1×2 splitters to bus waveguide 1606, which includes ports 1612 and 1614. In the depicted example, these splitters are conventional y-junctions; however, many alternative 1×2 splitters, such as multimode interferometers (MMI), etc., can be used without departing from the scope of the present invention. Arms 1608 and 1610 are substantially parallel and define longitudinal axis 1620. It should be noted that, in the depicted example, arms 1608 and 1610 have slightly different lengths such that a phase difference of $\pi/2+2n\pi$ (where n is an integer 0,1, 2 ...) exists between the light signals propagating through them.

Electromagnet 1604 is an electrically conductive trace that is dimensioned and arranged to generate equal and opposite magnetic fields at arms 1608 and 1610 when the electromagnet is energized with drive current I. The direction of the magnetic fields should be transverse to the propagation direction in the waveguide in order to generate nonreciprocal phase shift. In some embodiments, electromagnet 1604 includes separate traces at each of arms 1608 and 1610, which enables drive currents of different magnitudes to flow in each trace. By including different traces at the arms, nonreciprocal phase shifts of different magnitudes can be generated to, for example, compensate for path length errors in arms 1608 and 1610 due to fabrication tolerances.

Figure 17:
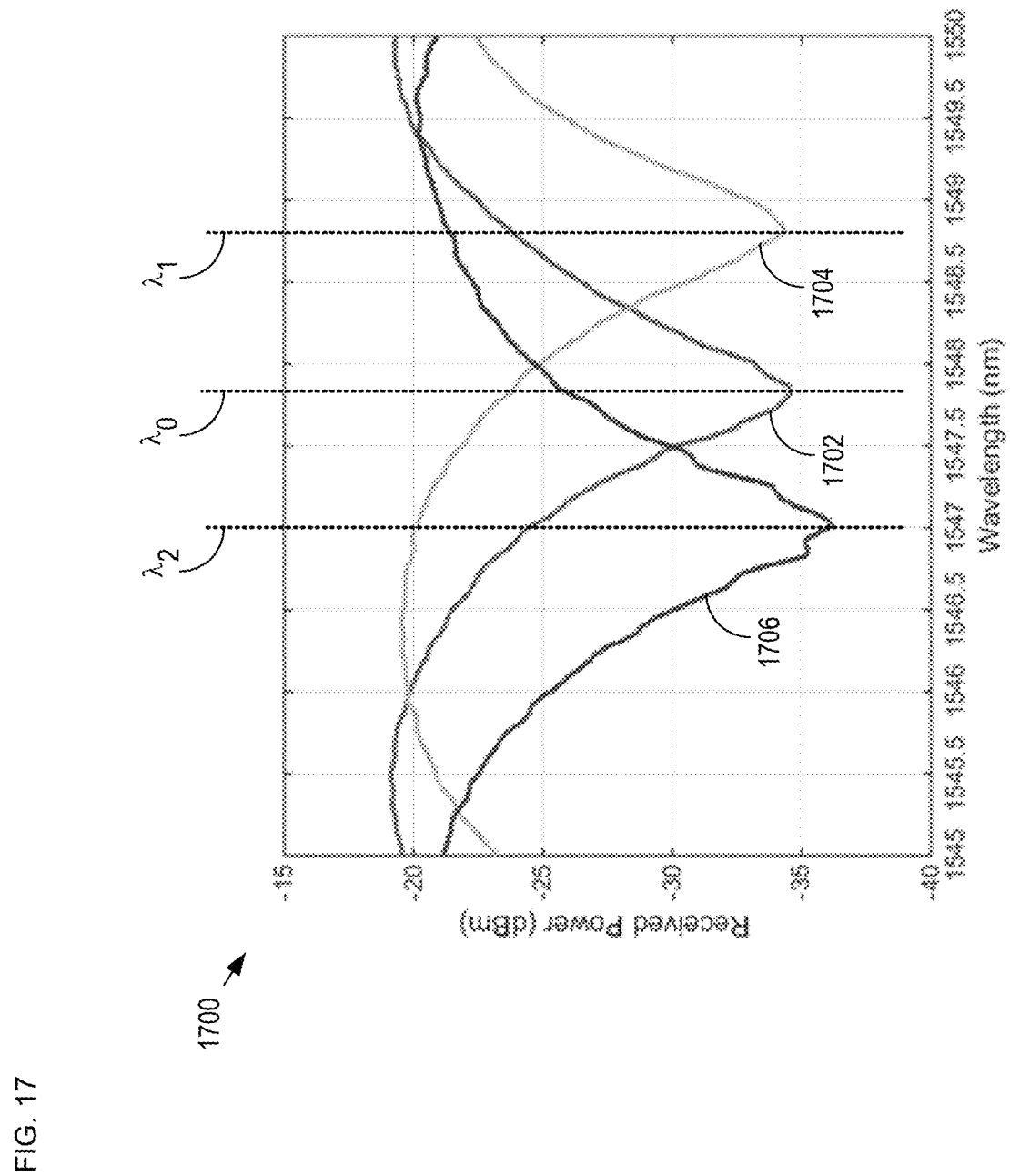
FIG. 17 depicts a plot of measured transmission of a light signal through isolator 1600.

FIG. 17 depicts a plot of measured transmission of a light signal through isolator 1600. Plot 1700 shows the transmission properties of the isolator in its three states of operation.

In a first operating state, no drive current flows through electromagnet 1604. Arm 1610 is designed to provide 90 degrees more phase shift than arm 1608. As a result, destructive interference develops at the y-junctions for light at fundamental wavelength $\lambda_0$ in both the forward and backward directions of propagation, as evinced by trace 1702. With no magnetic field established by electromagnet 1604, this phase shift is reciprocal. In the first operating state, light signal 404 can propagate between ports 1612 and 1614 in either direction.

In a second operating state, drive current I is provided such that it flows in the clockwise direction through electromagnet 1604. This gives rise to magnetic fields at arms 1608 and 1610 that are directed outward from longitudinal axis 1620 at each arm, creating equal and opposite non-reciprocal phase shifts in the arms. The magnitude of drive current I is selected such that, in the forward propagating direction, a nonreciprocal phase shift of +45° develops in arm 1608 and −45° develops in arm 1610. As a result, a net −90° non-reciprocal phase shift develops in arm 1610 with respect to arm 1608. When combined with the +90° phase shift in arm 1610 due the path-length difference between the arms, the portions of light signal 404 in both arms are in phase and constructively interfere in the forward direction.

In contrast, backward-propagating light (i.e., from port 1614 to port 1612) will see a net +90 degree non-reciprocal phase shift in arm 1610 with respect to arm 1608; therefore, the portions of light signal 404 in both arms will destructively interfere, blocking propagation of light signal 404 in this direction.

As seen from plot 1700, transmission for light characterized by $\lambda_1$ is high in the forward direction but low in the backward direction.

In some embodiments, a non-reciprocal phase shift is induced in only one of arms 1608 and 1610; however, the magnitude of the magnetic field necessary to create a desired phase difference in the two arms is reduced by creating equal and opposite phase shifts in both arms. This is sometimes referred to as a "push-pull configuration."

In operating state 3, the direction of drive current I is reversed such that it flows in the counter-clockwise direction (i.e., from terminal 1616 to 1618) through electromagnet 1604. This gives rise to magnetic fields at arms 1608 and 1610 that are the same magnitude but directed inward from longitudinal axis 1620 at each arm, thereby reversing the non-reciprocal phase shifts in the arms. As a result, propagation of light signal 404 is enabled from port 1614 to port 1612 but blocked from port 1612 to 1614.

Heaters 1622 are optionally included in isolator 1600 to enable control of the phase of the light propagating in arms 1608 and 1610 in a manner that is independent from the magneto-optic effects induced by electromagnet 1604. Each of the heaters includes a conductive traces 1624-1, 1624-2, and 1626. Conductive traces 1624-1 and 1624-2 run parallel to the waveguide of its respective arm such that the magnetic fields generated by an electric current running through them substantially cancel each other out.

In some embodiments heaters 1622 are not included. It should be noted that heaters 1622 can have any practical design without departing from the scope of the present invention.

Figure 18:
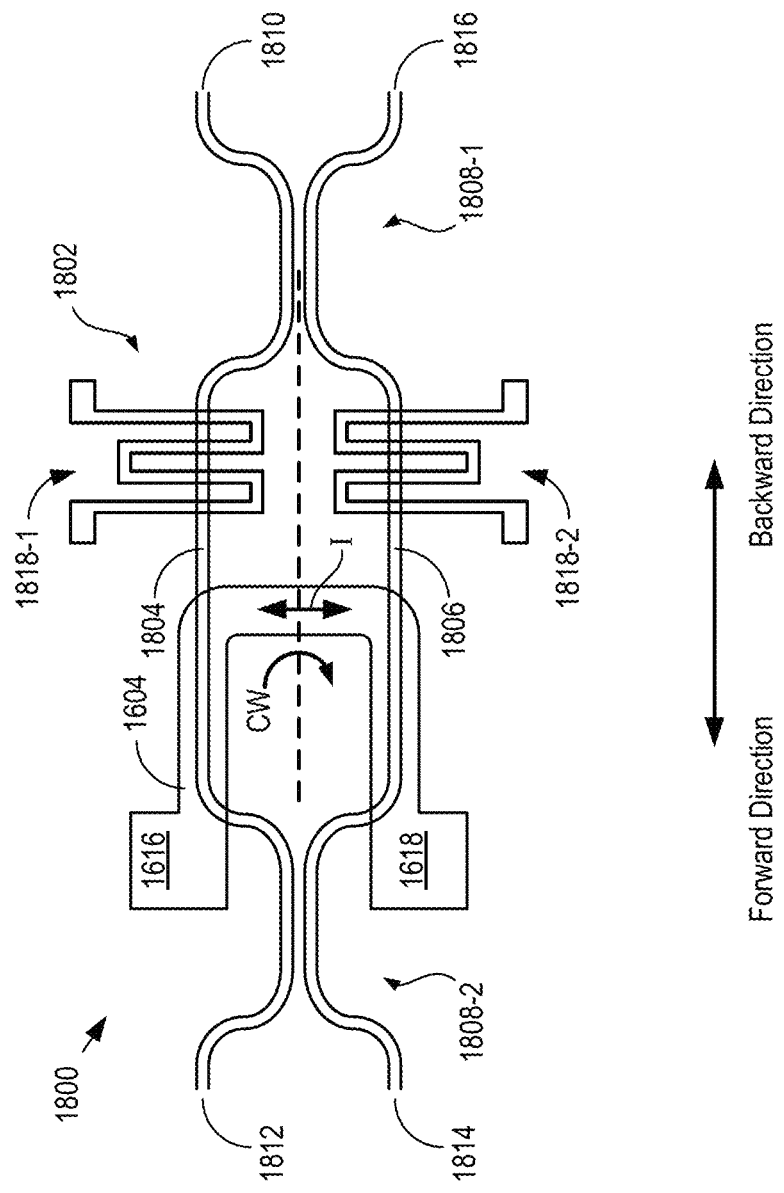
FIG. 18 depicts a schematic drawing of a top view of an optical circulator in accordance with another alternative embodiment of the present invention.

FIG. 18 depicts a schematic drawing of a top view of an optical circulator in accordance with another alternative embodiment of the present invention. Circulator 1800 includes a non-reciprocal element comprising phase-sensitive device 1802, electromagnet 1604, magneto-optic layer 104 (not shown), as well as heaters 1818-1 and 1818-2 (referred to, collectively, as heaters 1818). Circulator 1800 establishes inter-port connectivity for a light signal propagating between four ports, where the inter-port connectivity is based on a magnetic field generated by electromagnet 1604. Circulator 1800 has three operating states that are analogous to those of circulator 1200, as described above.

Phase-sensitive device 1802 includes bus waveguides 1804 and 1806, which are arranged to define directional couplers 1808-1 and 1808-2 (referred to, collectively, as couplers 1808) and ports 1810, 1812, 1814, and 1816. Bus waveguides 1804 and 1806 are analogous to bus waveguide 110. In some embodiments, different coupling elements, such as MMI, etc., are used in circulator 1800. As in the arms of isolator 1600, bus waveguides 1804 and 1806 are characterized by path-length difference that induces a reciprocal 90° phase difference in portions of light signal 404 as they propagate through the waveguides.

In a first operating state, no drive current flow through electromagnet 1604 (i.e., drive current I=0). In this state, couplers 1808 collectively enable light signal 404 to propagate between ports 1810 and 1812, as well as between ports 1814 and 1816, in each of the forward and backward directions.

In a second operating state, drive current I flows through electromagnet 1604 in the CW direction, giving rise to equal and opposite non-reciprocal phase shifts in each of bus waveguides 1804 and 1806, as discussed above and with respect to isolator 1600. In this state, couplers 1808 collectively enable the selective propagation of light signal 404 from port 1810 to 1812, from port 1812 to port 1814, from port 1814 to port 1816, and from port 1816 to port 1810.

In a third operating state, drive current I flows through electromagnet 1604 in the CCW direction and the propagation of light signal 404 is selectively enabled from port 1812 to 1810, from port 1810 to port 1816, from port 1816 to port 1814, and from port 1814 to port 1812.

As discussed above and with respect to isolator 1600, heaters 1818 are optionally included in circulator 1800 to provide control of the phase of the light propagating in bus waveguides 1804 and 1806 in a manner that is independent from the magneto-optic effects induced by electromagnet 1604. Preferably, the layout of heaters 1818 is predominantly transverse to the bus waveguides to mitigate the influence of the magnetic fields generated by the current flow through the heaters during operation.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A device that is an integrated-optics-based device comprising:
   a plurality of ports that includes a first port and second port;
   a first non-reciprocal element, including:
      a first phase-sensitive device disposed on a substrate;
      a first layer comprising a magneto-optic material, the first layer being disposed on the first phase-sensitive device; and
      a first electromagnet disposed on the first layer, the first electromagnet being dimensioned and arranged to generate a first magnetic field at the first phase-sensitive device when a first drive current flows through the first electromagnet;
   a first bus waveguide that is dimensioned and arranged to convey a first light signal characterized by a first wavelength, the first bus waveguide comprising the first port and the second port and being operatively coupled with the first non-reciprocal element; and
   a plurality of non-reciprocal elements that includes the first non-reciprocal element, each non-reciprocal element of the plurality of non-reciprocal elements, including:
      a phase-sensitive device disposed on the substrate;
      the first layer, wherein the first layer is disposed on the phase-sensitive device;
      an electromagnet that is dimensioned and arranged to generate a magnetic field at the phase-sensitive device when a drive current flows through the electromagnet; and
      a plurality of bus waveguides that includes the first bus waveguide, each bus waveguide of the plurality of bus waveguides comprising a different pair of ports, wherein at least one non-reciprocal element of the plurality of non-reciprocal elements is operatively coupled with at least one bus waveguide of the plurality of bus waveguides;

wherein the device is switchable between a plurality of operating states based on the first drive current, each operating state defining a different inter-port connectivity between the plurality of ports;

wherein the device has a first operating state of the plurality of operating states when the first drive current flows in a first direction;

wherein the device has a second operating state of the plurality of operating states when the first drive current flows in a second direction;

wherein the drive current flow through the electromagnet of each of the non-reciprocal elements is independent controllable; and wherein the device has $3^N$ operating states, where N is a total number of non-reciprocal elements in the plurality of non-reciprocal elements.

2. The device of claim 1, wherein the device has a third operating state of the plurality of operating states when a magnitude of the first drive current is equal to zero.

3. The device of claim 1 wherein a first inter-port connectivity enables propagation of the first light signal from the first port to the second port and blocks propagation of the first light signal from the second port to the first port, and wherein a second inter-port connectivity enables propagation of the first light signal from the second port to the first port and blocks propagation of the first light signal from the first port to the second port.

4. The device of claim 1 further comprising a second bus waveguide comprising a third port and a fourth port, the plurality of ports further including the third port and the fourth port, and the second bus waveguide being operatively coupled with the first non-reciprocal element.

5. The device of claim 4 wherein the first operating state defines a first inter-port connectivity that selectively enables propagation of the first light signal from the first port to the second port, from the second port to the third port, from the third port to the fourth port, and from the fourth port to a first port, and wherein the second operating state defines a second inter-port connectivity that selectively enables propagation of the first light signal from the first port to the fourth port, from the fourth port to the third port, from the third port to the second port, and from the second port to the first port.

6. The device of claim 4 further comprising:
a second non-reciprocal element, the plurality of non-reciprocal elements including the second non-reciprocal element, the second non-reciprocal element comprising:
  a second phase-sensitive device disposed on the substrate;
  the first layer, wherein the first layer is further disposed on the second phase-sensitive device; and
  a second electromagnet that is dimensioned and arranged to generate a second magnetic field at the second phase-sensitive device when a second drive current flows through the second electromagnet; and
a third bus waveguide comprising a fifth port and a sixth port, the plurality of ports further including the fifth port and sixth port;
wherein the first non-reciprocal element is operatively coupled with each of the first bus waveguide and second bus waveguide, and wherein the second non-reciprocal element is operatively coupled with each of the second bus waveguide and third bus waveguide; and wherein the first current and second current are independently controllable with respect to each other.

7. The device of claim 6 wherein the flow of each of the first drive current and second drive current is independently controllable between the first direction, the second direction, and a flow having zero magnitude, the plurality of operating states including:
  a first operating state when the first drive current flows in the first direction and the second drive current flows in the first direction;
  a second operating state when the first drive current flows in the first direction and the second drive current flows in the second direction;
  a third operating state when the first drive current flows in the first direction and the magnitude of the second drive current is equal to zero;
  a fourth operating state when the first drive current flows in the second direction and the second drive current flows in the first direction;
  a fifth operating state when the first drive current flows in the second direction and the second drive current flows in the second direction;
  a sixth operating state when the first drive current flows in the second direction and the magnitude of the second drive current is equal to zero;
  a seventh operating state when the magnitude of the first drive current is equal to zero and the second drive current flows in the first direction;
  an eighth operating state when the magnitude of the first drive current is equal to zero and the second drive current flows in the second direction; and
  a ninth operating state when the magnitude of the first drive current is equal to zero and the magnitude of the second drive current is equal to zero.

8. The device of claim 1, wherein the device further comprises a laser.

9. A device that is an integrated-optics-based device comprising:
  a plurality of ports that includes a first port and second port;
  a first non-reciprocal element, including:
    a first phase-sensitive device disposed on a substrate;
    a first layer comprising a magneto-optic material, the first layer being disposed on the first phase-sensitive device; and
    a first electromagnet disposed on the first layer, the first electromagnet being dimensioned and arranged to generate a first magnetic field at the first phase-sensitive device when a first drive current flows through the first electromagnet; and
  a first bus waveguide that is dimensioned and arranged to convey a first light signal characterized by a first wavelength, the first bus waveguide comprising the first port and the second port and being operatively coupled with the first non-reciprocal element;
wherein the device is switchable between a plurality of operating states based on the first drive current, each operating state defining a different inter-port connectivity between the plurality of ports;
wherein the device has a first operating state of the plurality of operating states when the first drive current flows in a first direction;
wherein the device has a second operating state of the plurality of operating states when the first drive current flows in a second direction; and
wherein the first phase-sensitive device comprises a first microring that is operatively coupled with the first bus waveguide to define a first ring resonator, and wherein the first electromagnet comprises a first loop conductor having substantially the same shape as the first microring, and wherein the flow of the first drive current in the first direction generates the first magnetic field such that it gives rise to a first clockwise resonance wavelength and a first counter-clockwise resonance wavelength in the first microring; and the flow of the first drive current in the second direction generates the first magnetic field such that it gives rise to a second clockwise resonance wavelength and a second counter-clockwise resonance wavelength in the first microring.

10. The device of claim 9 further comprising:
a second non-reciprocal element, comprising:
  a second phase-sensitive device including a second microring, wherein the second microring and the first bus waveguide collectively define a second ring resonator;
  the first layer, wherein the first layer is further disposed on the second phase-sensitive device; and
  a second electromagnet that includes a second loop conductor having substantially the same shape as the second microring, the second electromagnet being dimensioned and arranged to generate a second magnetic field at the second microring when a second drive current flows through the second electromagnet; wherein the first drive current and second drive current are inter-dependent; and
wherein the operating state of the device is based on the first drive current and second drive current.

11. The device of claim 9 further comprising:
a second non-reciprocal element, comprising:
  a second phase-sensitive device including a second microring;
  the first layer, wherein the first layer is further disposed on the second phase-sensitive device; and
  a second electromagnet that includes a second loop conductor having substantially the same shape as the second microring, the second electromagnet being dimensioned and arranged to generate a second magnetic field at the second microring when a second drive current flows through the second electromagnet; and
a second bus waveguide having a third port and a fourth port, the plurality of ports including the third port and fourth port; wherein the first drive current and second drive current are inter-dependent; wherein the first microring and second microring collectively define at least a portion of a coupled-microring filter; and
wherein each of the first bus waveguide and second bus waveguide is operatively coupled with the coupled-microring filter;
wherein the device has the first operating state of the plurality of operating states when the first drive current flows in the first direction and the second drive current flows in the second direction; and
wherein the device has the second operating state of the plurality of operating states when the first drive current flows in the second direction and the second drive current flows in the first direction.

12. A device that is an integrated-optics-based device comprising:
a plurality of ports that includes a first port and second port;
a first non-reciprocal element, including:
  a first phase-sensitive device disposed on a substrate;
  a first layer comprising a magneto-optic material, the first layer being disposed on the first phase-sensitive device; and
  a first electromagnet disposed on the first layer, the first electromagnet being dimensioned and arranged to generate a first magnetic field at the first phase-sensitive device when a first drive current flows through the first electromagnet; and
a first bus waveguide that is dimensioned and arranged to convey a first light signal characterized by a first wavelength, the first bus waveguide comprising the first port and the second port and being operatively coupled with the first non-reciprocal element;
wherein the device is switchable between a plurality of operating states based on the first drive current, each operating state defining a different inter-port connectivity between the plurality of ports;
wherein the device has a first operating state of the plurality of operating states when the first drive current flows in a first direction;
wherein the device has a second operating state of the plurality of operating states when the first drive current flows in a second direction; and
wherein the first phase-sensitive device comprises a Mach-Zehnder interferometer (MZI) having a first arm, second arm, and first longitudinal axis, the first arm comprising the first bus waveguide, and wherein the first electromagnet is dimensioned and arranged such that:
  the flow of the first drive current in the first direction generates a first magnetic field at the MZI that it is directed in one of an inward direction and outward direction relative to the first longitudinal axis; and
  the flow of the first drive current in the second direction generates the first magnetic field at the MZI such that it is directed in the other one of the inward direction and outward direction relative to the first longitudinal axis, and further wherein the phase of the first light signal in each of the first arm and second arm is based on the direction of the first magnetic field.

13. A method comprising:
providing a device that is an integrated-optics based device that is switchable between a plurality of operating states based on a first drive current, each operating state defining a different inter-port connectivity between a plurality of ports, wherein the device includes the plurality of ports, a first non-reciprocal element, and a first bus waveguide, and wherein the device is provided such that:
  the first non-reciprocal element includes:
    a first phase-sensitive device disposed on a substrate, the first phase-sensitive device comprising a first microring;
    a first layer comprising a magneto-optic material, the first layer being disposed on the first phase-sensitive device; and
    a first electromagnet disposed on the first layer, the first electromagnet being dimensioned and arranged to generate a first magnetic field at the first phase-sensitive device when the first drive current flows through the first electromagnet; wherein the first electromagnet is provided such that it includes a first loop conductor having substantially the same shape as the first microring, and further wherein the first electromagnet is dimensioned and arranged such that:

the flow of the first drive current in the first direction generates the first magnetic field such that it gives rise to a first clockwise resonance wavelength and a first counter-clockwise resonance wavelength in the first microring; and the flow of the first drive current in the second direction generates the first magnetic field such that it gives rise to a second clockwise resonance wavelength and a second counter-clockwise resonance wavelength in the first microring; and the first bus waveguide is dimensioned and arranged to convey a first light signal characterized by a first wavelength, the first bus waveguide comprising a first port and a second port, the plurality of ports including the first port and the second port, wherein the first non-reciprocal element and the first bus waveguide are operatively coupled, wherein the device has a first operating state of the plurality of operating states when the first drive current flows in a first direction; wherein the device has a second operating state of the plurality of operating states when the first drive current flows in a second direction; and wherein the device has a third operating state when the magnitude of the first drive current is equal to zero;

providing a first control signal to the first electromagnet, wherein the first control signal defines the magnitude and direction of the first drive current; and controlling the first control signal to control the magnitude and direction of the flow of the first drive current through the first electromagnet.

14. The method of claim 13 further comprising providing the first control signal such that the direction of the flow of the first drive current enables propagation of the first light signal from the first port to the second port and blocks propagation of the first light signal from the second port to the first port.

15. The method of claim 14 further comprising providing the first control signal such that the direction of the flow of the first drive current enables propagation of the first light signal from the second port to the first port and blocks propagation of the first light signal from the first port to the second port.

16. The method of claim 13 wherein the device is provided such that it further comprises a second bus wave guide that is dimensioned and arranged to convey the first light signal and includes a third port and a fourth port, the plurality of ports further including the third port and fourth port, and wherein the first non-reciprocal element and the second bus waveguide are operatively coupled.

17. The method of claim 16 further comprising providing the first control signal to enable the selective propagation of the first light signal from the first port to the second port, from the second port to the third port, from the third port to the fourth port, and from the fourth port to the first port.

18. The method of claim 16 further comprising providing the first control signal to enable the selective propagation of the first light signal from the first port to the fourth port, from the fourth port to the third port, from the third port to the second port, and from the second port to the first port.

19. The method of claim 16 wherein the device is provided such that it further comprises:

a third bus waveguide that is dimensioned and arranged to convey the first light signal and includes a fifth port and a sixth port, the plurality of ports further including the fifth port and sixth port; and a second non-reciprocal element that is located between and operatively coupled with the second bus waveguide and third bus waveguide, wherein the second non-reciprocal element includes:

a second phase-sensitive device disposed on the substrate;

the first layer, the first layer being disposed on the second phase-sensitive device; and a second electromagnet disposed on the first layer, the second electromagnet being dimensioned and arranged to generate a second magnetic field at the second phase-sensitive device when a second drive current flows through the second electromagnet; and wherein the method further comprises:

providing a second control signal to the second electromagnet, wherein the second control signal defines the magnitude and direction of the second drive current; and controlling the second control signal to control the magnitude and direction of the flow of the second drive current through the second electromagnet;

wherein the operating state of the device is based on the magnitude and direction of each of the first drive current and second drive current.

20. The method of claim 13, wherein the first phase sensitive device is provided such that it includes a coupled microring filter that includes the first microring and a second microring, wherein the device is provided such that it includes a second electromagnet comprising a second loop conductor having substantially the same shape as the second microring, and wherein the second electromagnet is dimensioned and arranged such that:

the flow of the second drive current in the first direction generates the second magnetic field such that it gives rise to the second clockwise resonance wavelength and second counter-clockwise resonance wavelength in the second microring; and the flow of the second drive current in the second direction generates the second magnetic field such that it gives rise to the first clockwise resonance wavelength and the first counter-clockwise resonance wavelength in the second microring.

* * * * *